United States Patent
Ide et al.

(10) Patent No.: US 6,897,899 B1
(45) Date of Patent: May 24, 2005

(54) ELECTRONIC IMAGE PICKUP APPARATUS

(75) Inventors: Masataka Ide, Hachioji (JP); Junichi Ito, Hachioji (JP); Yuji Imai, Higashiyamato (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/568,381

(22) Filed: May 10, 2000

(30) Foreign Application Priority Data

May 10, 1999 (JP) .................................... H11-128840

(51) Int. Cl.$^7$ .......................... H04N 5/232; G03B 3/10
(52) U.S. Cl. ...................... 348/350; 348/351; 348/345; 396/121
(58) Field of Search ................................. 348/350, 351, 348/345, 346, 347, 348, 352, 353, 354, 357; 396/121, 122

(56) References Cited

U.S. PATENT DOCUMENTS

| | | | |
|---|---|---|---|
| 4,774,539 A | * 9/1988 | Suda et al. | 396/114 |
| 5,262,819 A | * 11/1993 | Ohtaka et al. | 396/114 |
| 5,615,399 A | * 3/1997 | Akashi et al. | 396/128 |
| 5,654,790 A | * 8/1997 | Uchiyama | 396/123 |
| 5,892,578 A | * 4/1999 | Suda | 356/123 |
| 6,009,280 A | * 12/1999 | Akamatsu et al. | 396/121 |
| 2001/0045989 A1 | * 11/2001 | Onuki | 348/345 |

FOREIGN PATENT DOCUMENTS

| | | |
|---|---|---|
| JP | 07-281080 | 10/1995 |
| JP | 08-262564 | 10/1996 |
| JP | 09-274130 | 10/1997 |
| JP | 10-136244 | 5/1998 |

* cited by examiner

*Primary Examiner*—Andrew Christensen
*Assistant Examiner*—Lin Ye
(74) *Attorney, Agent, or Firm*—Frishauf, Holtz, Goodman & Chick, P.C.

(57) ABSTRACT

An electronic image pickup apparatus comprises a photographic optical system; solid state image pickup devices disposed on a plant where a subject image formed by subject beams which have passed through the photographic optical system is formed; a main mirror disposed between the photographic optical system and the solid state image pickup devices, wherein a part of the main mirror is formed of a half mirror to divide the subject beams which have passed through the photographic optical system into an observing beam and a focus detecting beam; a sub-mirror for reflecting the subject beam which has passed through the part of the main mirror; a focus detecting optical system for forming an image of the subject beam reflected by the sub-mirror on a partial area of the solid image pickup devices; and an electrical circuit for outputting focus detecting information based on image signals of the partial areas of the solid image pickup devices. The structure provides an electronic image pickup apparatus which contributes to the down-sizing of the apparatus and to the reduction of production cost by eliminating an image pickup device which is dedicated for focus detection.

11 Claims, 14 Drawing Sheets

151: FOCUS DETECTING AREA
150: FRAME OF PHOTOGRAPHING SCREEN

21: IMAGE PICKUP DEVICE
100: IMAGE PICKUP AREA (LIGHT RECEIVING SECTION)
153a, 153b: VIEW FIELD MASK IMAGE
152a, 152b: FOCUS DETECTING LIGHT RECEIVING AREA

ELECTRONIC IMAGE PICKUP APPARATUS

BACKGROUND OF THE INVENTION

1. Field of the Invention

The present invention relates to an electronic image pickup apparatus and more specifically to a focus detecting unit applied to an electronic image pickup apparatus having image pickup devices for generating electrical image signals by photoelectrically converting an optical image of a subject formed by a photographic optical system.

2. Description of the Related Art

Various proposals have been made lately on electronic image pickup apparatuses such as a digital still camera and a digital video camera which are capable of photoelectrically converting an optical image of a subject formed of light beams which have been transmitted through a photographic optical system into electrical signals by utilizing image pickup devices such as CCDs (Charge Coupled Device) and of recording image signals generated therefrom to a recording medium or the like as image data of a predetermined mode.

For instance, Japanese Patent Laid-Open No. Hei. 8-262564 has disclosed a single-lens reflex type electronic image pickup apparatus constructed so as to be able to form an optical image to be photographed and recorded and an optical image for observation at different positions by using beams which have been transmitted through a single photographic optical system. This electronic image pickup apparatus is provided with image pickup means such as solid state image pickup devices on an image forming plane for picking up the image and image pickup means for detecting a focal point at the position equivalent to that image forming plane beside the image pickup means. The apparatus is arranged so as to carry out a focusing operation by a focus detecting means (AF means) using the TTL phase difference detecting method for detecting the focusing state of the optical image by guiding a part of the beams which have been transmitted through the photographic optical system to the focus detecting image pickup means.

An electronic image pickup apparatus disclosed in Japanese Patent Laid-Open No. Hei. 274130 is a so-called video movie camera for shooting and recording mainly video images. While it is provided with image pickup means such as image pickup devices disposed within the camera main body, a focusing detecting unit of the TTL phase difference detecting method comprising other image pickup means different from the image pickup means such as the image pickup devices is disposed with the inside of a lens barrel for holding camera lenses.

However, the prior art electronic image pickup apparatuses disclosed in Japanese Patent Laid-Open Nos. Hei. 8-262564 and 274130 comprise an image pickup means such as image pickup devices dedicated for detecting the focal point beside an image pickup means such as image pickup devices for shooting and recording an optical image.

Such a construction has caused problems that a number of parts of the whole electronic image pickup apparatus increases and the size of the apparatus itself increases. At the same time, because it requires a plurality of expensive parts such as the image pickup devices, it has caused a problem that the production cost also increases.

SUMMARY OF THE INVENTION

Accordingly, it is an object of the invention to provide an electronic image pickup apparatus for photoelectrically converting an image of a subject formed by a photographic optical system into image signals by utilizing image pickup devices which can contribute to the down-sizing of the apparatus itself and to the reduction of the production cost and wherein no image pickup device dedicated for detecting a focal point is required.

An electronic image pickup apparatus according to a first aspect of the invention comprises a photographic optical system; solid image pickup devices disposed on a plane where a subject image formed by beams of subject light which have passed through the photographic optical system is formed; a main mirror disposed between the photographic optical system and the solid state image pickup devices, wherein a part of the main mirror is formed of a half mirror to divide the subject light beams which have passed through the photographic optical system into an observing beam and a focus detecting beam; a sub-mirror for reflecting the subject light beam which has passed through the part of the main mirror; a focus detecting optical system for forming an image of the subject light beam reflected by the sub-mirror on a partial area of the solid state image pickup devices; and an electrical circuit for outputting focus detecting information based on image signals of the partial areas of the solid state image pickup devices.

An electronic image pickup apparatus according to a second aspect of the invention comprises a photographic optical system; a finder optical system for allowing a subject image formed of subject light beams which have passed through the photographic optical system to be observed; solid image pickup devices disposed on a plane where the subject image formed by the subject light beams which have passed through the photographic optical system is formed; a reflecting mirror for reflecting at least a part of the subject light beams in a direction different from the finder optical system; a focus detecting optical system for forming an image of the subject light beam reflected by the reflecting mirror on a predetermined area of the solid state image pickup devices; and an electrical circuit for outputting focus detecting information based on image signals of the predetermined areas of the solid state image pickup devices.

An electronic image pickup apparatus according to a third aspect of the invention comprises a photographic optical system; image pickup means for executing an image pickup operation for picking up a subject image via the photographic optical system; reflecting means which advances between the photographic optical system and the image pickup means during a photographing preparing state to reflect at least a part of subject light beams to the outside of the photographing optical path; a focus detecting optical system for forming an image of the subject light beams reflected by the reflecting means in a predetermined area in the image pickup area of the image pickup means; and focus detecting means for carrying out a focus detecting operation based on signals from the solid image pickup means.

The above and other objects and advantages of the invention will become more apparent from the following detailed explanation.

According to the present invention, it is possible to provide an electronic image pickup apparatus for photoelectrically converting a subject image formed by the photographic optical system into image signals by utilizing image pickup devices, and for recording the image signals to a recording medium as image data, which can contribute to the down-sizing of the apparatus itself and to the reduction of the production cost by arranging the apparatus such that no image pickup device dedicated for detecting the focal point is required.

DESCRIPTION OF THE PREFERRED EMBODIMENTS

Figure 1:
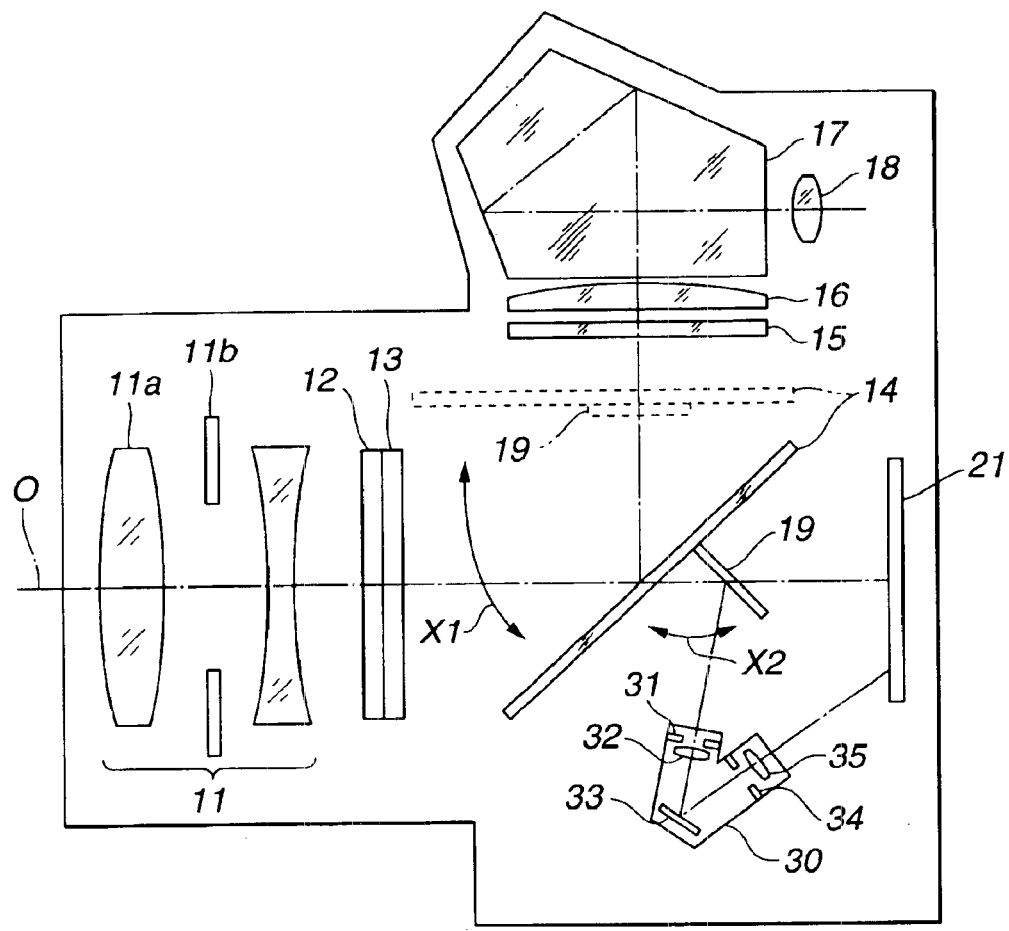
FIG. 1 is a diagram showing the disposition of the main components of an electronic image pickup apparatus of a first embodiment of the invention together with optical paths within the electronic image pickup apparatus of beams which have been transmitted through a photographic optical system.

FIG. 1 is a diagram schematically showing the disposition of the main components of an electronic image pickup apparatus of a first embodiment of the invention together with optical paths within the electronic image pickup apparatus of beams which have been transmitted through a photographic optical system. It is noted that FIG. 1 shows only components which are directly related to the invention to simplify the diagram.

As shown in FIG. 1, a photographic optical system 11 comprising a plurality of lenses and other elements for condensing beams from a subject (hereinafter referred to as subject beams) and for guiding the subject beams to the inside of the electronic image pickup apparatus is disposed at the front side of the electronic image pickup apparatus.

The photographic optical system 11 comprises an in-focus lens 11a which is a focus adjusting optical system for adjusting the focus by moving in the direction along an optical axis 0 to form the subject image at a predetermined position and a stopping member 11b for controlling a quantity of light of the subject beams transmitting through the photographic optical system 11. The stopping member 11b has functions of holding a predetermined diaphragm opening and of blocking the input subject beam by completely closing the opening.

An infrared cut filter 12 for mainly removing the infrared component in light components contained in the subject beams and an optical low-pass filter (LPF) 13 for reducing noise components such as moire among the optical components contained in the subject beams are disposed behind the photographic optical system 11.

A main mirror 14 which is a reflecting mirror is partly formed of a half-mirror section, serves as a dividing optical system capable of dividing the subject beams which have been transmitted through the photographic optical system 11 into an observing focus detecting beam. The main mirror 14 is an optical member capable of passing the subject beam by receding to the outside of the optical path of the subject beam and is disposed behind the LPF 13 so that one end thereof freely turns in the direction of an arrow X1 in FIG. 1 with respect to an internal fixing member (not shown) of the electronic image pickup apparatus.

A sub-mirror 19 formed of an optical member such as a total reflection mirror is provided at a predetermined position on the back of the main mirror 14 and is turnable with respect to the main mirror 14 so as to be able to guide the subject beams which have been transmitted through the half-mirror section of the above-mentioned main mirror 14 to a focus detecting optical system 30.

Then, image pickup means comprising solid image pickup devices 21 (hereinafter simply referred to as CCDs 21) is disposed behind the main mirror 14 and at the position of an image forming plane where a subject image formed by the subject beams which have been transmitted through the photographic optical system 11 is formed. The CCD 21 generates an electrical image signal by receiving and photoelectrically converting the optical subject image. Various solid image pickup devices such as the CCD described above and a MOS type sensor may be applied to the CCD 21.

A finder optical system for receiving the beams of the subject from the photographic optical system 11 to mainly observe the subject image is disposed at a predetermined position above the main mirror 14. A focus detecting optical system 30 for receiving the part of the beams of the subject from the photographic optical system 11 to guide to predetermined a position on the light receiving plane of the CCD 21 to form the image again is disposed at a predetermined position under the main mirror 14.

Only a partial area of the main mirror 14 is formed of the half mirror as described above and another area is formed of a total reflecting mirror. The partial area in this case is the area corresponding to the sub-mirror 19 and the area formed of the half-mirror, i.e., the half-mirror section, is arranged so as to transmit the subject beam from the photographic optical system 11 and the area other than the half-mirror section is arranged so as to totally reflect the subject beam from the photographic optical system 11.

The main mirror 14 turns centering on the fulcrum of a fixed member (not shown) between the position (hereinafter referred to as a photographic preparing position) indicated by a solid line in FIG. 1 and the position (hereinafter referred to as a photographing position) indicated by a dash line in FIG. 1. At the same time, the sub-mirror 19 is disposed at a predetermined position corresponding to the position of the main mirror 14 by following the turn of the main mirror 14.

When the main mirror 14 is located at the photographing preparing position (the position of the solid line in FIG. 1) the main mirror 14 is disposed aslant by about 45 degrees with respect to the optical axis. The reflecting plane of the main mirror 14 faces to the side of the photographic optical system 11 (that is, to the side of the subject in front of the electronic image pickup apparatus) and to the side of the finder optical system.

The sub-mirror 19 is disposed so as to have a predetermined angle with respect to the main mirror 14 on the optical path of the subject beam at this time. Then, the reflecting plane of the sub-mirror 19 faces to the side of the photographic optical system 11 (the side of the subject) and to the side of the focus detecting optical system 30.

Accordingly, a part of the subject beam from the photographic optical system 11 is guided to the side of the finder optical system by the total reflecting plane of the main mirror 14 and the other part of the subject beams which have been transmitted through the half-mirror section of the main mirror 14 is guided to the side of the focus detecting optical system 30 by the total reflecting plane of the sub-mirror 19.

Thereby, when the main mirror 14 is located at the photographing preparing position, only the subject beams which have been transmitted through the half-mirror section of the main mirror 14 and have gone through the sub-mirror 19 and the focus detecting optical system 30 are guided to the CCD 21.

Meanwhile, when the main mirror 14 is located at the photographing position (the position of the dot line in FIG. 1), the main mirror 14 and the sub-mirror 19 recede to the position where they do not block the optical path of the subject beams which have been transmitted through the photographic optical system 11 as described above. Accordingly, all of the subject beam is guided to the side of the CCD 21 at this time and is irradiated to the whole area of the light receiving plane of the CCD 21.

The finder optical system comprises a pint plate 15 and a condenser lens 16 which are disposed in the vicinity of an image forming plane where the observing subject image is formed to guide the subject beam to the position for observing the subject image, a pentagonal prism 17 for guiding the subject image to the observing position and for reversing right and left images, an eyepiece lens 18 for magnifying the subject image formed on the pint plate 15 to form the image at the optimum observing position and other elements (not shown).

The focus detecting optical system 30 comprises a view field mask 31, a field lens 32, a total reflection mirror 33, a pupil mask 34, an image reforming lens 35 and other elements (not shown) and plays a role of forming an image of a predetermined mode at a predetermined position on the light receiving plane of the CCD 21 from a focus detecting subject beam which is a part of the subject beam from the photographic optical system 11 and which is guided by the action of the main mirror 14 and the sub-mirror 19 when the electronic image pickup apparatus is put in the photographing preparing state.

The focus detecting optical system 30 in the electronic image pickup apparatus will be explained in detail below.

Figure 2:
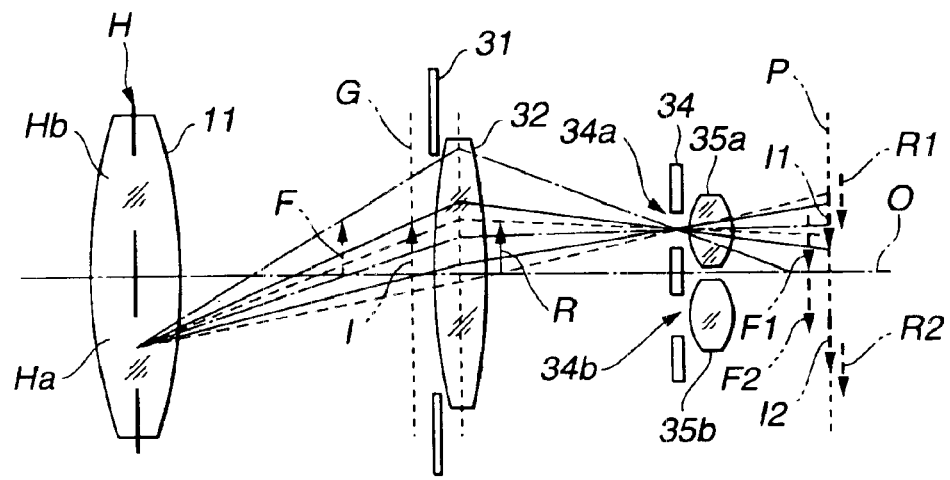
FIG. 2 is a side section view showing the structure of a focus detecting optical system in the electronic image pickup apparatus of FIG. 1 and conceptually showing the state how the beams of the subject light which have been transmitted through the photographic optical system arrive at the image pickup device via the focus detecting optical system.
Figure 3:
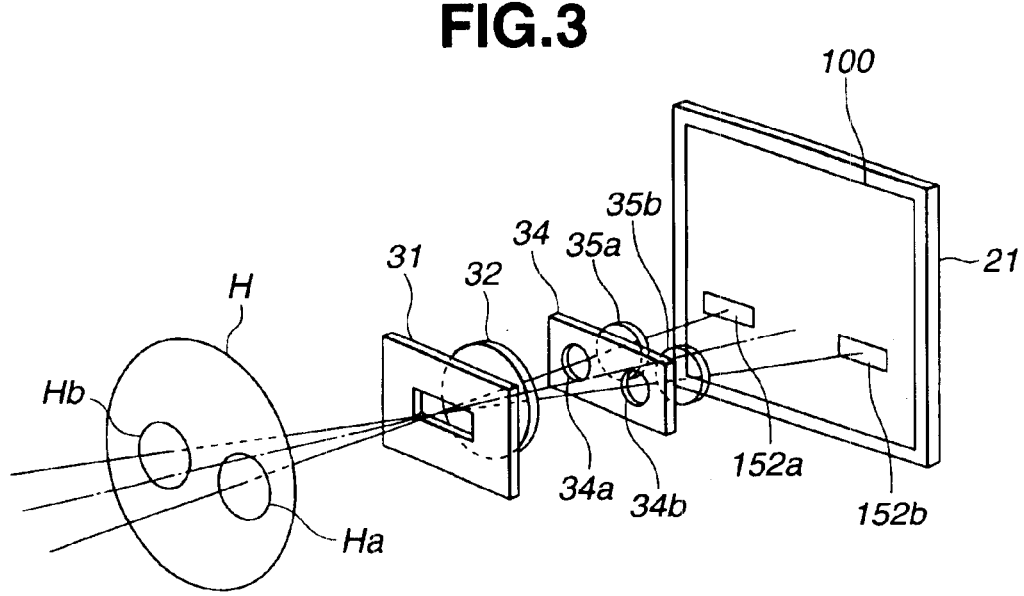
FIG. 3 is a perspective view showing the structure of the focus detecting optical system of the electronic image pickup apparatus of FIG. 1 and conceptually showing the state how the beams of the subject light which have been transmitted through the photographic optical system arrive at the image pickup device via the focus detecting optical system.

FIGS. 2 and 3 are side section and perspective views showing the conceptual structure of the focus detecting optical system in the electronic image pickup apparatus and conceptually showing the state how the subject beams which have been transmitted through the photographic optical system 11 arrive at the CCD 21 via the focus detecting optical system 30. It is noted that in FIGS. 2 and 3, the components which are considered to be unnecessary for explaining the structure and the action of the focus detecting optical system 30, i.e., the main mirror 14, the sub-mirror 19, the total reflection mirror 33 and a casing member for holding and unitizing each component of the focus detecting optical system 30, will be omitted here and only the main components are shown here to simplify the figures. Further, although the optical path of the subject beam of only one exit pupil Ha side is shown in FIG. 2, that of the other side (Hb side) is not shown in the figure because it is symmetrical to Ha.

The focus detecting optical system 30 in the electronic image pickup apparatus is an optical system for guiding the focus detecting beam contributing for the focus detecting operation to the CCD 21 and comprises a part of the so-called TTL phase difference detecting type focus detecting means.

As shown in FIGS. 2 and 3, the focus detecting optical system 30 comprises the view filed mask 31 for restricting an irradiation range of the subject beams which have been transmitted through the photographic optical system 11 (not shown in FIG. 3), the field lens 32 for condensing the subject beam which has passed through the view field mask 31, the total reflection mirror 33 (not shown in FIGS. 2 and 3) for bending the optical path of the subject beams which have been transmitted through the field lens 32 to guide to the side of the CCD 21, the pupil mask 34 having two openings 34a and 34b which are disposed almost symmetrically about the optical axis O of the subject beam to split the subject beam reflected by the total reflection mirror 33 into two beams, the image reforming lens 35 comprises two lenses 35a and 35b disposed at the behind positions corresponding to the openings 34a and 34b of the pupil mask 34 and other elements (not shown).

The subject beam which has been inputted from the photographic optical system 11 to the electronic image pickup apparatus constructed as described above follows the following path.

The subject beam inputted to the photographic optical system 11 is restricted to a predetermined quantity of light by the stopping member 11b. When it is outputted to the rear part after passing through the photographic optical system 11, its unnecessary light components are removed by the infrared cut filter 12 and the LPF 13.

The optical path of the subject beam varies depending on the state of the main mirror 14 disposed behind the photographic optical system 11 and the two filters 12 and 13 as described above.

When the main mirror 14 is located at the photographing position (the position indicated by the dash line in FIG. 1), the optical path of the subject beams which have been transmitted through the photographic optical system 11 is not blocked by the main mirror 14 and, the sub-mirror 19 and the whole beam is irradiated to the whole area of the light receiving plane of the CCD 21. Receiving such beam, the image pickup means such as the CCD 21 executes a predetermined image pickup operation.

When the main mirror 14 is located at the photographing preparing position (the position indicated by the solid line in FIG. 1) on the other hand, the optical path of the subject beam irradiated toward the main mirror 14 is bent, except for a part thereof, by about 90 degrees by the total reflecting plane of the main mirror 14 and is reflected toward the finder optical system disposed thereabove.

The subject image is formed from the subject beam guided to the finder optical system side on the pint plate 15 and the condenser lens 16. At the same time, the beam which has been transmitted through them enters the pentagonal prism 17. The pentagonal prism 17 changes the optical path thereof in a predetermined direction and the beam is outputted behind the electronic image pickup apparatus via the eyepiece lens 18. Then, the eyepiece lens 18 forms the subject image into a predetermined size again.

In this case, the main mirror 14 reverses the upper and lower images of the subject image formed from the subject beam to form on the pint plate 15. The pentagonal prism 17 also reverses the right and left images and the eyepiece lens 18 magnifies the image. Thereby, the photographer can observe the subject image adequately.

The part of the subject beam from the photographic optical system 11 transmits through the half-mirror section of the main mirror 14 and advances to the sub-mirror 19. The sub-mirror 19 bends its optical path by a predetermined angle to guide to the focus detecting optical system 30.

The subject beam guided to the focus detecting optical system 30 arrives at a predetermined position on the light receiving plane of the CCD 21 through the following path.

That is, the subject beams which have been transmitted through the two areas Ha and Hb of the output pupil H of the photographic optical system 11 as shown in FIGS. 2 and 3 form the image on the plane corresponding to a reference character G shown in FIG. 2 (hereinafter the plane indicated by the reference character G will be referred to as an image forming plane). The image forming plane G is the position corresponding to the light receiving plane of the pint plate 15 when the main mirror 14 is located at the photographing preparing position (the position of the solid line in FIG. 1) and is the position corresponding to the light receiving plane of the CCD 21 when the main mirror 14 is located at the photographing position (the position of the dotted line in FIG. 1).

Figure 5:
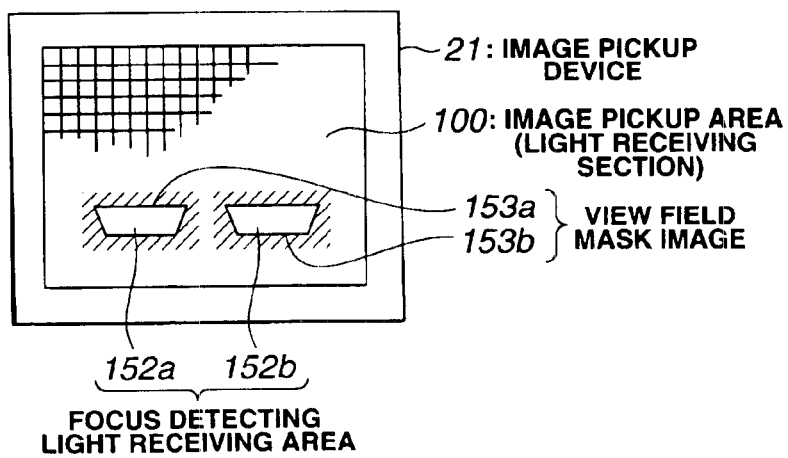
FIG. 5 is a conceptual diagram showing a light receiving area of a light receiving section (image pickup area) of an image pickup device (CCD) corresponding to the focus detecting area of the photographing screen of the electronic image pickup apparatus of FIG. 1.

While the subject beam enters the focus detecting optical system 30 via the path described above, the subject beam which has entered the focus detecting optical system 30 is irradiated to predetermined light receiving areas 152a and 152b on an image pickup area 100 which is the light receiving plane of the CCD 21 to form the image again there after passing through the view field mask 31, the field lens 32, two openings 34a and 34b of the pupil mask 34 and the image reforming lens 35 (see FIG. 5).

When an image I is formed on the image forming plane G in focus by the photographic optical system 11 in this case (see FIG. 2), the image I turns to first and second images I1 and I2 as it is imaged again on the image pickup area 100 of the CCD 21 by the field lens 32 and the image reforming lens 35. It is noted that the image pickup area 100 of the CCD 21 is a secondary image forming plane which is vertical to the optical axis O.

When the state of the photographic optical system 11 is that of front pin, i.e., when the subject image F is formed in front of the image forming plane G, the subject image F is imaged again at the position close the optical axis O as the first and second images F1 and F2.

When the state of the photographic optical system 11 is that of rear pin, i.e., when the subject image R is formed behind the image forming plane G, the subject image R is imaged again at the position separated from the optical axis O as the first and second images R1 and R2.

That is, the focus detecting optical system 30 forms the two images of the first image (I1, R1 or F1) and the second image (I2, R2 or F2) by receiving the part of the subject beam as described above. Then, it can detect the state of the photographic optical system 11, i.e., whether it is focused or not or it is in the front pin state or in the rear pin state, by detecting the output of the CCD 21 by the first and second images in each case and by detecting the distance between them by implementing a predetermined process based on a signal thus obtained. Means generally used in the conventional focus detecting unit of measuring the distance between the both images by finding the distributions of light intensity of the first and second images from each image data output of the corresponding predetermined areas 152a and 152b (see FIG. 5) of the CCD 21 is adopted for the detecting means of this time.

Figure 4:
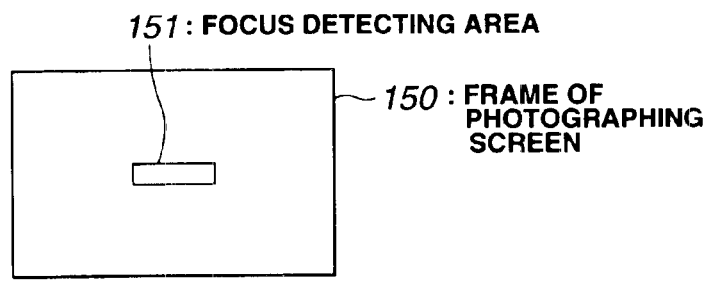
FIG. 4 is a diagram showing the disposition of a focus detecting area within a photographic screen in of the electronic image pickup apparatus of FIG. 1.

It is noted that the whole photographic area, i.e., the range of the image pickup area 100 of the CCD 21, corresponds to a photographing screen frame 150 (see FIG. 4) which can be observed by the finder optical system for example. Then, the focus detecting area 151 is set within the photographing screen frame 150 to implement the focus detecting operation to the subject corresponding to a predetermined area within the range of the photographing screen frame 150, e.g., the area located almost at the center.

The focus detecting subject beam transmits through the half-mirror section of the main mirror 14 to be guided to the focus detecting optical system 30 by the sub-mirror 19 as described above. Accordingly, the focus detecting area 151 may be set at a desired position by arbitrarily setting the position of the half-mirror section of the main mirror 14 and the sub-mirror 19.

Then, the focus detecting optical system 30 forms view field mask images 153a and 153b at the predetermined position within the range specified by the view field mask 31 and the predetermined images again in the areas within the view field mask images 153a and 153b, i.e., in the focus detecting light receiving areas 152a and 152b. At this time, the output signal, i.e., the image data in the predetermined range, from the CCD 21 is fed to a control circuit (not shown in FIGS. 1 through 5 see the micro-computer 61 in FIG. 6 described later, which executes a focus detecting arithmetic operation.

It is noted that the view field mask images 153a and 153b turn out to be trapezoidal images whose upper part is opened more or less as shown in FIG. 5 because the beam is irradiated obliquely from the lower side to the CCD 21 and the image is formed again on the light receiving plane of the CCD 21. Although the images formed again on the light receiving areas 152a and 152b are also deformed in the same manner in this case, the influence to the symmetrical similarity of the focus detecting light receiving areas 152a and 152b is very small because it is a deformation almost in the vertical direction with respect to the pupil splitting direction (direction along the long side of the photographic screen). Accordingly, it barely affects the accuracy in detecting the focus state.

Figure 6:
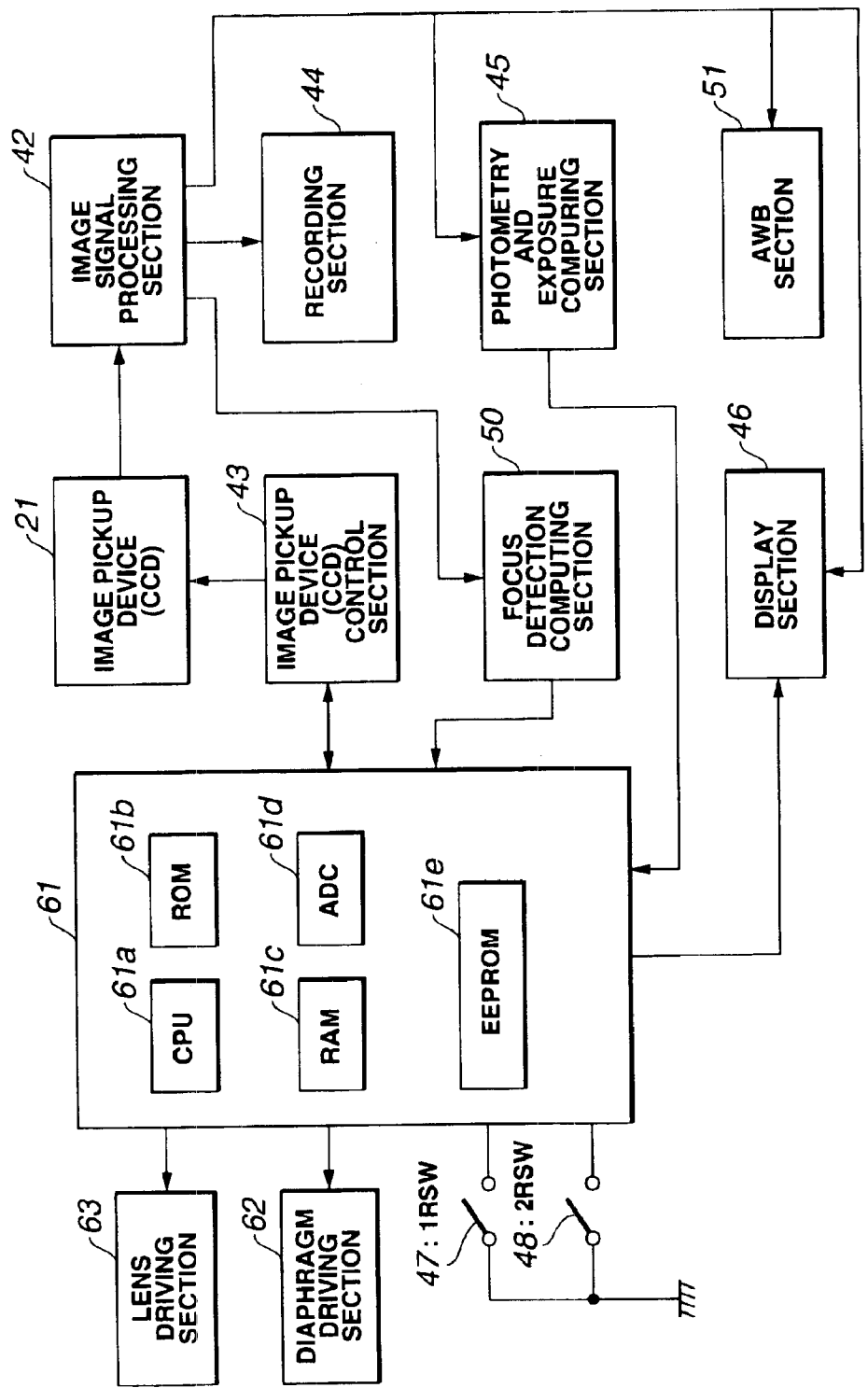
FIG. 6 is a block diagram showing the main electrical components of the electronic image pickup apparatus of FIG. 1.

FIG. 6 is a block diagram showing the main electrical components of the electronic image pickup apparatus.

The whole electronic image pickup apparatus is controlled by the micro-computer 61 which is the control means comprising a central processing unit (hereinafter referred to as a CPU) 61a. That is, the micro-computer 61 is a controller of the system of the electronic image pickup apparatus and comprises the CPU 61a, a ROM 61b, a RAM 61c, and A/D converter (ADC) 61d, an EEPROM 61e which is an internal memory, and other elements (not shown). The micro-computer 61 controls a series of operations of the electronic image pickup apparatus in accordance with a sequence program stored in advance in the ROM 61b provided therein.

Correcting data peculiar to each electronic image pickup apparatus related to arithmetic operations on focus control, photometry, exposure, AWB (auto white balance) and the like is stored in the EEPROM 61e.

The micro-computer 61 is connected electrically with a diaphragm driving section 63 for driving and controlling the stopping member 11b (see FIG. 1), a lens driving section 62 for driving and controlling the in-focus lens 11a (see FIG. 1) and other element, and a group of switches for generating various command signals in linkage with various control members (not shown), e.g.., a first release switch (1RSW) 47 for generating command signals for executing preliminary operations such as photometry and AF operation in starting the photographing operating and a second release switch (2RSW) 48 for generating a command signal for driving the stopping member 11b and other elements (not shown) to execute an exposing operation.

It is noted that the 1RSW 47 and the 2RSW 48 are configured as a so-called two-stage switch which is constructed so that it can be manipulated by a single manipulating member.

The micro-computer 61 is also connected electrically with a CCD control section 43 which comprises a timing generator (hereinafter referred to as a TG) 82 and a signal generator (hereinafter referred to as a SG) 83 as shown in a diagram showing the structure of the main block in FIG. 7. Then, the CCD control section 43 is connected electrically with the CCD 21 so as to control the drive of the CCD 21.

The CCD 21 converts the optical subject image formed by the subject beams which have been transmitted through the photographic optical system 11 into electrical signals. The detailed structure of the CCD 21 will be described later (see FIGS. 8 and 9).

The CCD 21 is connected electrically with an image signal processing section 42. The signal processing circuit 42 generates image signals of a predetermined mode by implementing predetermine processes on the output signal from the CCD 21. The signal processing circuit 42 is connected electrically with a focus detecting computing section 50, a photometry and exposure computing section 45, an AWB section 51, a display section 46, a recording section 44 and other elements (not shown). Then, the signal processing circuit 42 generates and outputs the image signals of the optimum mode and information accompanying thereto to the respective structure blocks.

The focus detecting computing section 50 is a circuit comprising a focus detecting section for detecting and computing the focal position by receiving the output signal from the signal processing circuit 42. The result of the computation, data judging the focusing state and data on predetermined drive of the in-focus lens 11a are outputted to the micro-computer 61.

The photometry and exposure computing section 45 is a circuit for calculating the optimum exposure data, i.e., the stopping value of the stopping member 11b and the value of speed of an electronic shutter of the CCD 21, by receiving the output signal from the signal processing circuit 42 and by detecting the brightness of the subject. The result of calculating is outputted to the micro-computer 61. Then, receiving the data, the micro-computer 61 drives the stopping member 11b via the diaphragm driving section 63 so that the predetermined stopping value is attained and drives and controls the CCD 21 with the predetermined value of electronic shutter speed via the CCD control section 43.

The AWB section 51 is a circuit for automatically adjusting the white balance of the subject so that it is optimized by receiving the output signal from the signal processing circuit 42. The image signal optimally adjusted by the AWB section 51 is outputted to the display section 46.

The display section 46 is formed of an image displaying device such as a liquid crystal display (LCD) for example and displays the image signals inputted via the signal processing circuit 42 and the AWB section 51 as an image. It also displays photographing information accompanying to the image signal and internal information of the electronic image pickup apparatus itself such as a photographing mode visually in the shape of characters and symbols.

The recording section 44 receives the output signal from the signal processing circuit 42 and records the image signal and accompanying photographing information (hereinafter simply referred to as image signal and others) in a predetermined mode.

The detailed structure of the signal processing circuit 42, the recording section 44 and the CCD control section 43 will be explained below.

Figure 7:
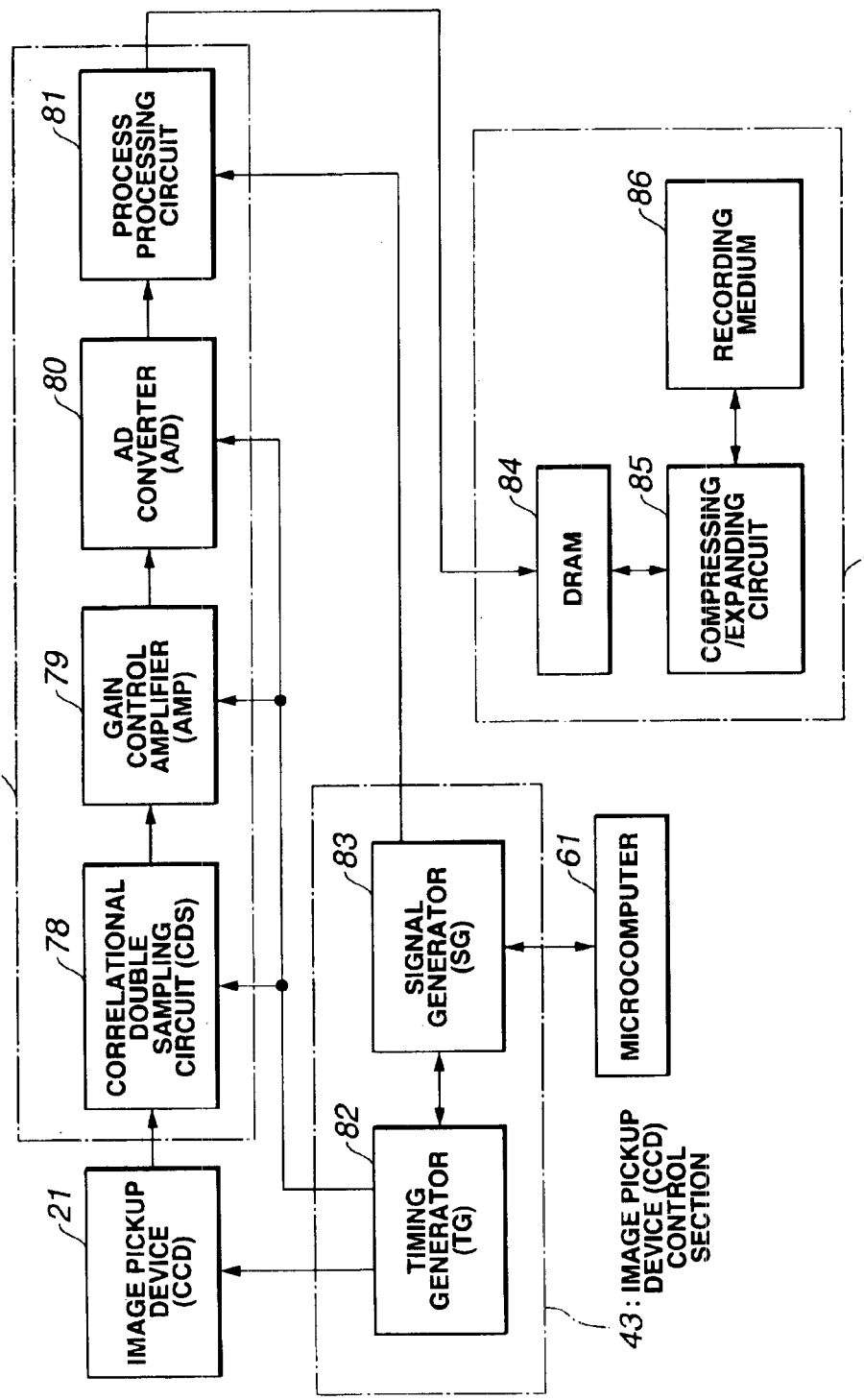
FIG. 7 is a block diagram showing the main part by taking out an image signal processing section, a recording section and a part of the main electrical circuits electrically connected to them in the electronic image pickup apparatus of FIG. 1.

FIG. 7 is a block diagram showing the main part by taking out the image signal processing section 42, the recording section 44 and a part of the main electrical circuits electrically connected to them.

The signal processing circuit 42 comprises a correlational double sampling circuit (hereinafter referred to as a CDS) 78 for removing reset noise and the like from the image signal obtained by the CCD 21, a gain control amplifier (hereinafter referred to as an AMP) 79 for amplifying the output of the CDS 78, an AD converter (hereinafter referred to as an A/D) 80 for converting the output (analog signal) of the AMP 79 into a digital signal, a process processing circuit 81 for implementing predetermined processes to the image signal converted into the digital signal by the A/D 80, and other elements (not shown).

The CCD control section 43 controls the predetermined operations of the CCD 21 by outputting driving signals thereto and comprises a TG 82, a SG 83 and other elements (not shown).

The TG 82 generates a driving signal such as a transfer pulse for driving the CCD 21 as well as sample-hold pulses of the correlational double sampling circuit 78 of the signal processing circuit 42 and AD conversion timing pulses of the A/D converter 80. The SG 83 generates a signal for synchronizing the micro-computer 61 with the TG 82.

Then, the CCD control section 43 plays a role of an electronic shutter of the CCD 21 during exposure, i.e., of controlling the exposure time, based on the result of computation of the photometry and exposure computing section 45 under the command of the micro-computer 61.

The recording section 44 is constructed so as to be able to store the output signal from the signal processing circuit 42 in a recording medium 86 as image data file of a predetermined mode as described above.

That is, the recording section 44 comprises a DRAM 84 which is a temporary memory for receiving the image signal and others outputted from the process processing circuit 81 of the signal processing circuit 42 to store them temporarily, a recording medium 86 for storing the image signal and others in a predetermined area as the image data file, and a compressing/expanding circuit 85 comprising a circuit for implementing the optimum signal processing, i.e., compressing the image signal and others inputted via the DRAM 84 to record to the recording medium 86 as the image data file and a circuit for implementing the optimum signal processing for reading and reproducing the image data file recorded in the recording medium 86.

Figure 8:
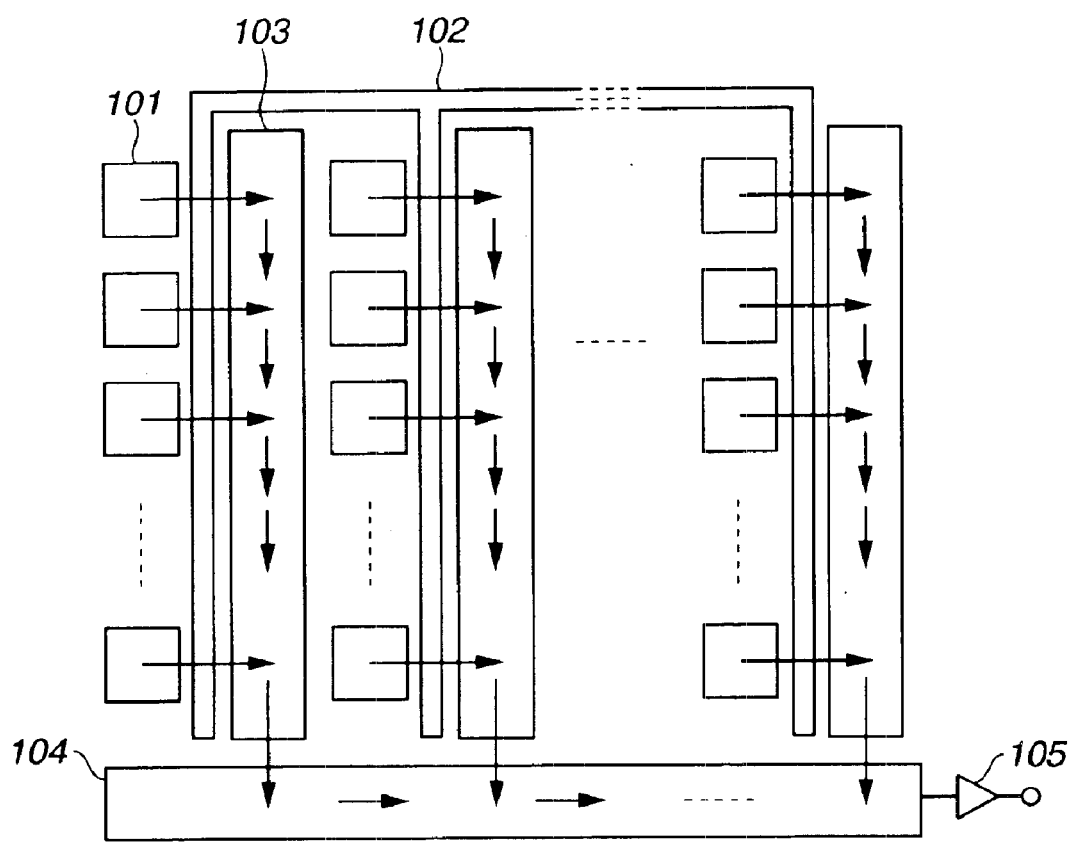
FIG. 8 is a diagram showing the image pickup device (CCD) of the electronic image pickup apparatus of FIG. 1 by enlarging a part thereof.

The structure of the CCD 21 of the electronic image pickup apparatus will be explained below in detail. FIG. 8 is a diagram showing the image pickup device (CCD) of the electronic image pickup apparatus by enlarging a part thereof.

The charge transfer type of the CCD 21 applied to the electronic image pickup apparatus of the present embodiment is an interline transfer type. A plurality of light receiving devices which turn out to be an image pickup section are arrayed two-dimensionally in the horizontal and vertical directions in the light receiving plane of the CCD 21 so that each individual light receiving device forms one pixel.

The CCD 21 comprises photodiodes 101 which are a group of light receiving devices disposed two-dimensionally in the horizontal and vertical directions, a transfer gate 102 for transferring charges (first video image) stored in the photodiodes 101 to a vertical shift register 103, the vertical shift register 103 for transferring the transferred charges sequentially in the vertical direction and a horizontal shift register 104 for transferring the charges transferred in the vertical direction by the vertical shift register 103 sequentially in the horizontal direction and an output section 105 for converting the charges transferred in the horizontal direction by the horizontal shift register 104 into a voltage signal to be outputted.

A micro-lens array (not shown) formed of spherical lenses each having predetermined curvature and predetermined focal distance is disposed in front of the photodiode 101, i.e., on the side of the light receiving plane. This micro-lens array is disposed corresponding to each light receiving device in order to improve the light sensitivity of the CCD 21.

Input light may be condensed efficiently by providing the micro-lens array in front of each light receiving device, i.e., on the beam input plane side. Such arrangement has been generally put into practical use and is called as on-chip micro-lenses.

Figure 9:
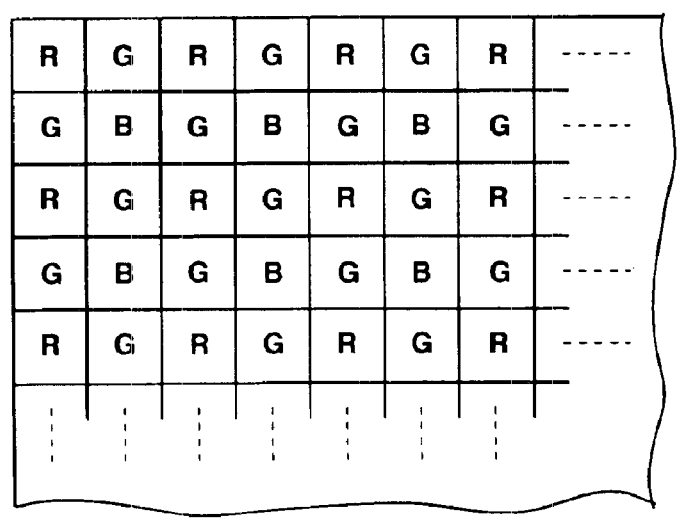
FIG. 9 is a chart showing an array of color elements of a color filter of the image pickup device (CCD) of the electronic image pickup apparatus of FIG. 1.

Color filters (not shown in FIG. 8. See FIG. 9) are disposed in front of the photodiode 101. The color filters are arrayed in the manner of a so-called Bayer array as shown in FIG. 9. It is noted that the reference characters R, G and B shown in FIG. 90 denote color filter elements selectively transmitting red, green and blue, respectively.

The operation of the electronic image pickup apparatus of the present embodiment constructed as described above will be explained below.

Figure 10:
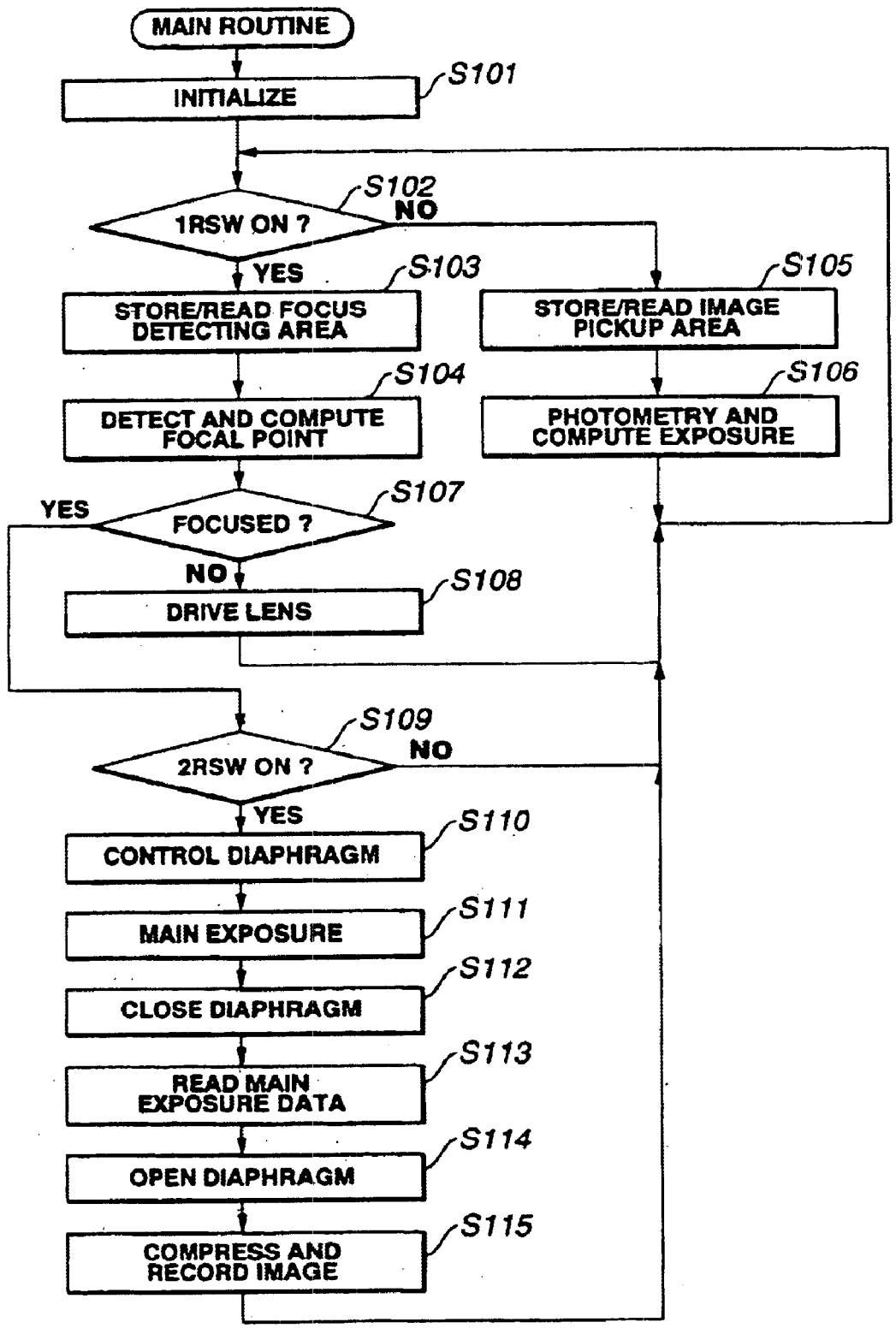
FIG. 10 is a flowchart showing a main routine of control means (microcomputer) of the electronic image pickup apparatus of FIG. 1.

FIG. 10 is a flowchart showing a main routine of the micro-computer 61, i.e., the cm, of the electronic image pickup apparatus. FIGS. 11A through 11G are time charts showing actions when the image pickup operation is carried out in the electronic image pickup apparatus.

The electronic image pickup apparatus is activated when power is started to be fed to the electrical circuits including the micro-computer 61 by turning on a main power switch (not shown) or by loading a battery for example. Thereby, the sequence program stored in the ROM 61b in the micro-computer 61 in advance is executed.

In this state, each electrical circuit block of the electronic image pickup apparatus is initialized in Step S 101.

Next, the micro-computer 61 detects the status of the 1RSW 47 to confirm whether it is turned on or not. When it confirms an ON signal of the 1RSW 47 which is generated as a predetermined manipulating member (not shown) is manipulated in Step S 102, it advances the process to Step S 103.

When it confirms no ON signal of the 1RSW 47, it advances the process to Step S 105. A series of photometric operations (hereinafter referred to simply as photometric operations) such as storing and reading operations of the light receiving devices which are the image pickup section of the CCD 21 are carried out in Step S 105.

Then, receiving the image signal outputted from the signal processing circuit 42 and is obtained by the CCD 21, the photometry and exposure computing section 45 executes the predetermined photometric and exposure computing processes in Step S 106. Thereby, the micro-computer 61 calculates information required during the main exposure operation (in recording images), i.e., adequate exposure information corresponding to the subject such as the stopping value of the stopping member 11b and the value of electronic shutter speed of the CCD 21.

Figure 11:
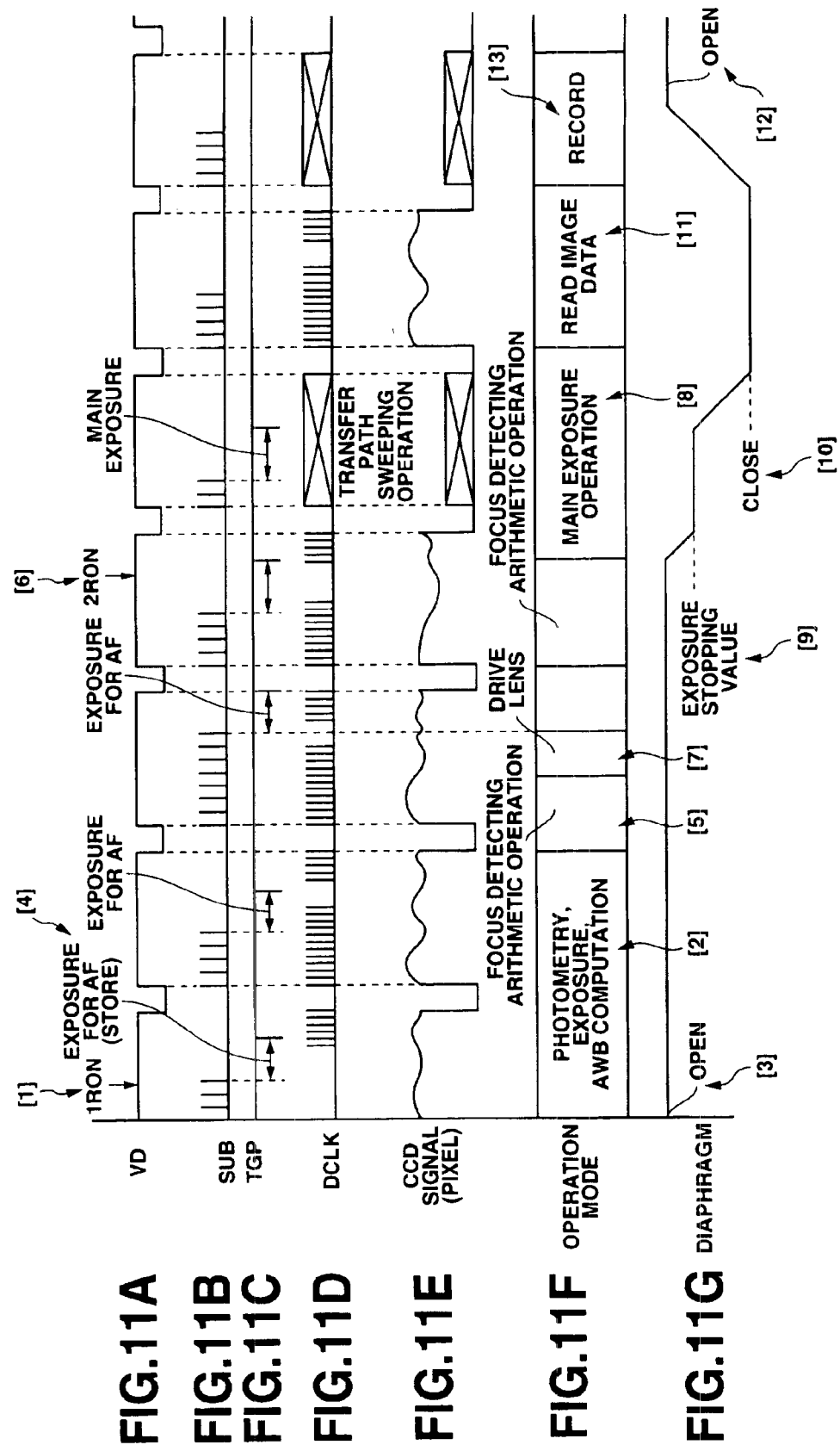
FIGS. 11A through 11G are time charts showing actions when the image pickup operation is carried out in the electronic image pickup apparatus of FIG. 1.

That is, the photometric operation is started when the electronic image pickup apparatus is activated and is repeatedly executed (see reference numeral [2] in FIG. 11F). At this time, the stopping member 11b is in the released state as indicated by the reference number [3] in FIG. 11G.

When, when the micro-computer 61 confirms that the 1RSW 47 has been turned on in Step S 102 described above (see the reference number [1] in FIG. 11A, it executes the focus detecting operation in the next Step S 103 by using the CCD 21. At this time, the subject beams which have been transmitted through the photographic optical system 11 are guided to the focus detecting optical system 30 via the main mirror 14 and the sub-mirror 19 as described above. Then, the predetermined images are formed on the predetermined light receiving areas 152a and 152b in the image pickup area 100 of the CCD 21 via the focus detecting optical system 30.

Accordingly, the storing operation (AF exposure. See the reference numeral [4] in FIG. 11C. The detail will be described with reference to FIG. 12) within the light receiving areas 152a and 152b in the CCD 21 is carried out in Step S 103. The focus detecting image signal thus obtained is outputted from the CCD 21 to the focus detecting computing section 50 via the signal processing circuit 42 (reading operation) and the focus detecting computing section 50 executes the predetermined focus detecting arithmetic operation based on that output signal in Step S 104 (see the reference numeral [5] in FIG. 11F). It is noted that the predetermined focus detecting operation executed here will be described later in detail (see FIG. 13).

Next, it is judged whether the result of the focus detecting operation executed in the above-mentioned Step S 104 is in the in-focus state or non-focus state in Step S 107. When it is judged to be the in-focus state, the process is shifted to Step S 109 or when it is judged to be the non-focus state, the process is shifted to Step S108.

The micro-computer 61 calculates an amount of move of the in-focus lens 11a to put the system into the in-focus state based on the result of the focus detecting operation in the above-mentioned Step S 104 and moves the in-focus lens 11a by driving and controlling the lens driving section 62 based on that calculation result (see the reference numeral [7] in FIG. 11F). After that, the micro-computer 61 returns the process to Step S 102 to repeat the similar process of the AF operation thereafter.

Meanwhile, the micro-computer 61 detects the status of the 2RSW 48 to confirm whether it is ON or not in Step S 109. When it confirms that the 2RSW 48 is ON (see the reference numeral [6] in FIG. 11A), the micro-computer 61 advances the process to Step S 110. When it confirms that the 2RSW 48 is OFF, it returns the process to Step S 102 to continuously execute the sequence thereafter while waiting for the time when the 2RSW 48 is turned ON.

The main exposure operation (see the reference numeral [8] in FIG. 11F) is executed in the process after Step S 110.

In the main exposure operation, the micro-computer 61 controls the photographic optical system 11 via the diaphragm driving section 63 to drive same so that the exposure stopping value calculated in the above-mentioned Step S 106 is attained (diaphragm controlling process. See the reference numeral [9] in FIG. 11G) in Step S 110.

Then, in Step S 111, the CCD control section 43 controls the CCD 21 to start the storing operation of the CCD 21 by changing over a charge sweep-out signal (SUB. See FIG. 11B) to OFF and to execute the main exposure operation by the electronic shutter speed value calculated by the exposure computing process in Step S 106 (see the reference numeral [8] in FIG. 11F). Here, controlling the electronic shutter is an operation for transferring the storage charges of the photodiode 101 to the vertical shift register 103 by generating the charge transfer pulse (TGP. See FIG. 11C) at a predetermined timing corresponding to the electronic shutter speed value calculated by the CCD control section 43.

Then, in Step S 112, the micro-computer 61 drives the stopping member 11b so that it is completely closed via the diaphragm driving section 63 to prevent noise components such as so-called smear from mixing into the image signal to be obtained (see the reference numeral [10] in FIG. 11G). Thereby, the light receiving plane of the CCD 21 is shaded.

Next, the CCD control section 43 outputs an image reading signal (DCLK. See FIG. 11D) to the CCD 21 while keeping the shaded state of the CCD 21 in Step S 113. Then, the signal processing circuit 42 reads it after A/D converting the signal of the CCD 21 (CCD signal: Image signal. See FIG. 11E) outputted in synchronism with that signal (DCLK).

Then, the micro-computer 61 transits a predetermined diaphragm releasing command to drive the stopping member 11b to release the stopping member 11b via the diaphragm driving section 63 (see the reference numeral [12] in FIG. 11G) in Step S 114.

Further, the signal processing circuit 42 implements a predetermined process such as a compressing process to put the image signal obtained by the CCD 21 into the optimum recording mode and then stores it in the predetermined area of the recording medium 86 (see the reference numeral [12] in FIG. 11G) in Step S 115. After that, the micro-computer 61 ends the series of operations and returns the process to Step S 102 described above to repeat the processes thereafter in the same manner.

Next, the procedure of the focus detecting storing operation (AF exposure) and of the focus detecting arithmetic operation carried out by the image pickup device (CCD) in carrying out the focus detecting operation in the electronic image pickup apparatus will be explained by referring to the flowcharts in FIGS. 12 and 13.

Figure 12:
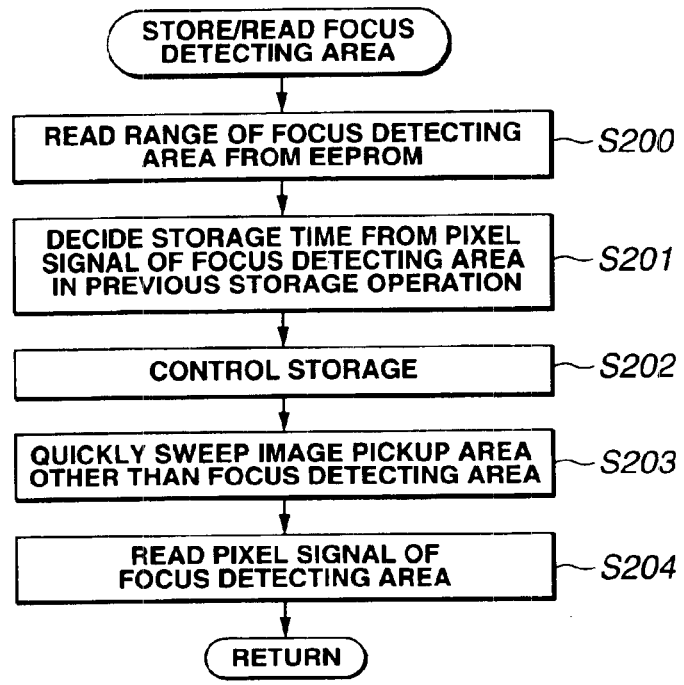
FIG. 12 is a flowchart showing the sequence of storing and reading operations in the focus detecting light receiving area of the image pickup device (CCD) of the electronic image pickup apparatus of FIG. 1.
Figure 13:
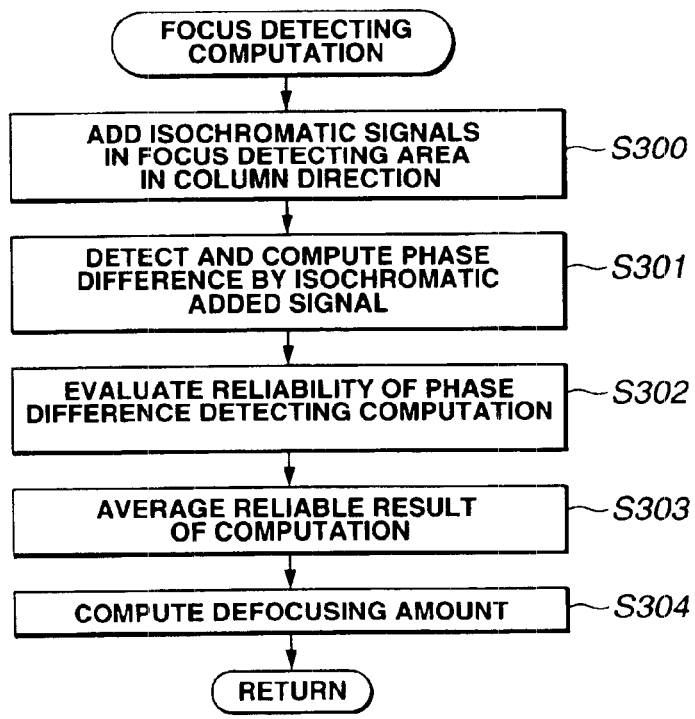
FIG. 13 is a flowchart showing the sequence of a focus detecting arithmetic operation carried out in the electronic image pickup apparatus of FIG. 1.

FIG. 12 is a flowchart showing the sequence of storing and reading operations in the focus detecting light receiving area of the image pickup device (CCD) of the electronic image pickup apparatus and FIG. 13 is a flowchart showing the sequence of a focus detecting arithmetic operation.

It is noted that the sequence shown in FIG. 12 corresponds to the process in Step S 103 in FIG. 10 and the sequence shown in FIG. 13 corresponds to the process in Step S 104 in FIG. 10. These will be described below in detail.

The sequence of the storing and reading operations in the focus detecting light receiving area will be explained at first by using FIG. 12.

In Step S 200, the micro-computer 61 reads information related to the focus detecting light receiving areas 152a and 152b, i.e., information related to the effective pixel range of the light receiving areas 152a and 152b, in the image pickup area 100 of the CCD 21 in the electronic image pickup apparatus from the EEPROM 61e.

The information related to the effective pixel range of the light receiving areas 152*a* and 152*b* is peculiar information different per each CCD 21 applied to the individual electronic image pickup apparatus. Accordingly, the peculiar information has been confirmed per each electronic image pickup apparatus in advance in manufacturing the electronic image pickup apparatus and adequate information corresponding to each electronic image pickup apparatus is stored in advance in the EEPROM 61*e* provided within the microcomputer 61 of each electronic image pickup apparatus.

Next, the micro-computer 61 calculates and decides a storage time by which an adequate image signal may be obtained by making reference to the image signal in the light receiving areas 152*a* and 152*b* obtained by the storing operation previously carried out in Step S 201.

Then, based on the storage time calculated in Step S 201, the micro-computer 61 controls the storing operation of the CCD 21 via the CCD control section 43 in Step S 202.

The micro-computer 61 executes the operation for reading the output of the CCD 21, i.e., the image signal, in Step S 203. The image signals in the area other than the light receiving areas 152*a* and 152*b* of the image pickup area 100 are not used in carrying out this focus detecting operation, so that the reading time may be shortened by carrying out the so-called quick sweep-out operation.

Then, in Step S 204, the micro-computer 61 reads only the image signals of the area corresponding to the light receiving areas 152*a* and 152*b* based on the information on the effective pixel range read out of the EEPROM 61*e* in the process of Step S 200 and returns to the main routine in FIG. 10.

It is noted that the arithmetic operations of photometry, exposure and AWB are carried out by using the CCD 21 beside such focus detecting arithmetic operation in the electronic image pickup apparatus. In this case, they may be carried out by utilizing the whole area of the image pickup area 100 without carrying out the quick sweep-out process as described above or by reading the image signal of the area corresponding to a predetermined area for carrying out the photometric and exposure computing processes and for carrying out the AWB computation in the same manner with the focus detecting computation process. It may be carried out by storing information related to each predetermined area in advance in the EEPROM 61*e* and others and by carrying out a process for reading the corresponding information before executing each computation. Then, the required subject beam must be guided to each predetermined area in the image pickup area 100 of the CCD 21 by predetermined means by forming the whole of the main mirror 14 by the half-mirror for example.

Next, the sequence in carrying out the focus detecting computation based on the image signals of the focus detecting light receiving areas 152*a* and 152*b* obtained as described above will be explained with reference to FIG. 13.

The known TTL phase difference detecting method is used in the focus detecting computing process executed in the electronic image pickup apparatus. Accordingly, its detailed explanation will be omitted here and only the part characteristic in the present embodiment will be explained below in detail.

After shifting to the sequence of the focus detecting computation (see Step S 104 in FIG. 10 and FIG. 13), the micro-computer 61 adds the same color signals within the focus detecting area, i.e., within the light receiving areas 152*a* and 152*b* in Step S 300.

Figure 14:
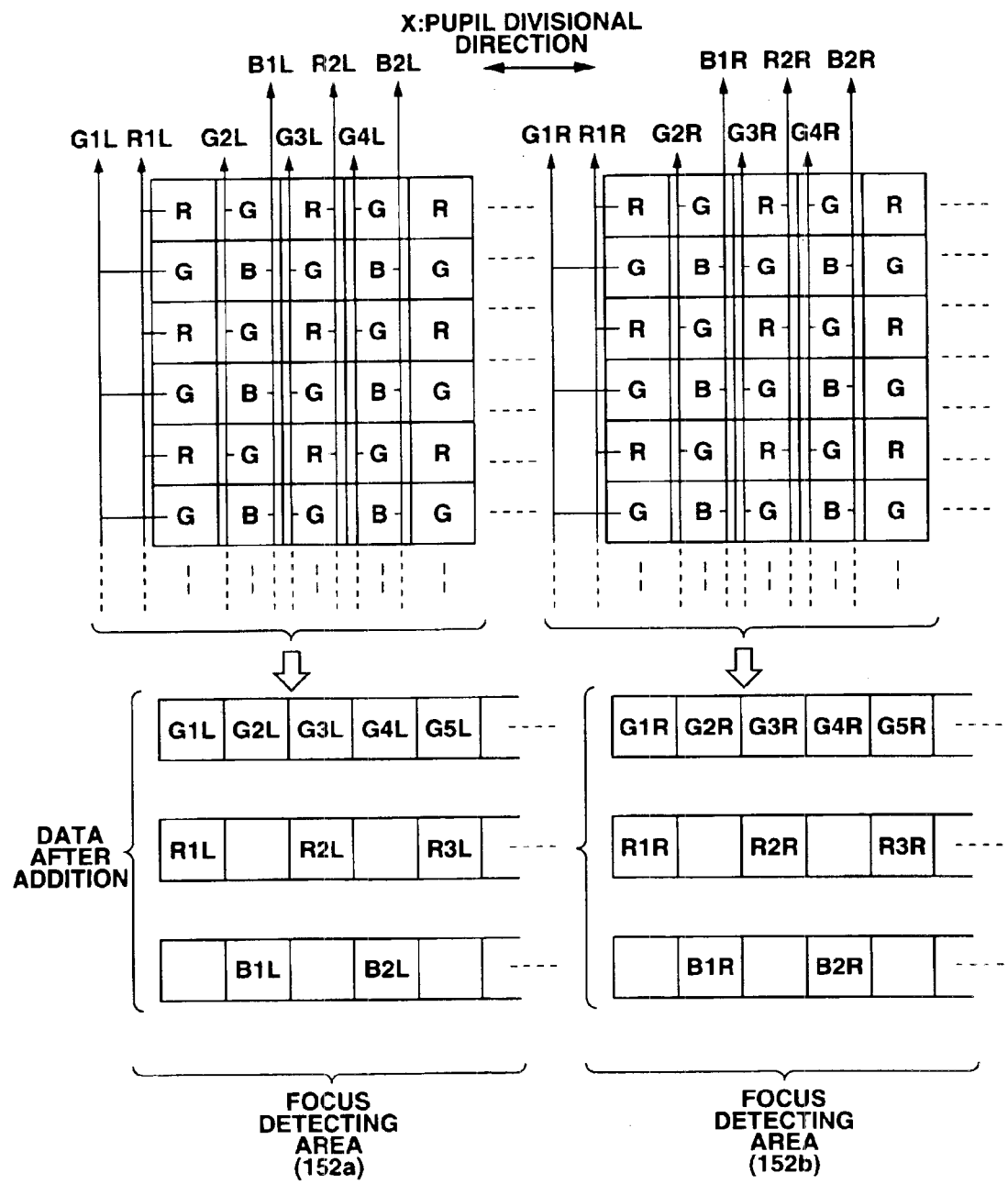
FIG. 14 is a diagram conceptually showing an adding process in carrying out the focus detecting arithmetic operation in the electronic image pickup apparatus of FIG. 1.

That is, the micro-computer 61 adds the pixel signals of the same color in the column direction in the direction orthogonal to the pupil splitting direction denoted by a reference character X in FIG. 14 in the focus detecting light receiving areas 152*a* and 152*b* of the CCD 21. This adding process is carried out for the respective color elements of R, G and B. It is noted that FIG. 14 is a diagram conceptually showing the adding process in carrying out the focus detecting arithmetic operation.

The adding process is carried out as follows.

In the focus detecting light receiving area 152*a* of the CCD 21, data obtained by adding the R signals among the same color signals in the first column is R1L and data obtained by adding the G signals is G1L as shown in FIG. 14. In the same manner, data obtained by adding the G signals among the same color signals in the second column is G2L and data obtained by adding the B signals is B1L.

The similar adding process is carried out also in the focus detecting light receiving area 152*b* of the CCD 21 to obtain predetermined data in the same manner. Then, the data G1L, G2L, G3L, . . . may be obtained for the G signals on the side of the light receiving area 152*a* and G1R, G2R, G3R, . . . may be obtained on the side of the light receiving area 152*b*. In the same manner, the data R1L, R2L, R3L, . . . may be obtained for the R signals on the side of the light receiving area 152*a* and R1R, R2R, R3R, . . . may be obtained on the side of the light receiving area 152*b* and the data B1L, B2L, B3L, . . . may be obtained for the B signals on the side of the light receiving area 152*a* and B1R, B2R, B3R, . . . may be obtained on the side of the light receiving area 152*b*.

Next, in Step S 301, the micro-computer 61 carries out the general phase difference detecting operation per each color element of R, G and B by using the data of the same color added signal obtained in Step S 300.

For instance, it carries out the phase difference detecting operation by the added data G1L, G2L, G3L, . . . on the light receiving area 152*a* side and the added data G1R, G2R, G3R, . . . of the light receiving area 152*b* side.

Then, the micro-computer 61 evaluates the reliability of the phase difference detecting operation in Step S 301 to judge whether or not it is possible to detect the focal point in Step S 302.

Next, the micro-computer 61 selects the results of computation judged to be reliable and to be capable of detecting the focal point and carries out an averaging process.

Then, the micro-computer 61 calculates a defocusing amount from the above-mentioned calculation result in Step S 304 and returns the process to the main routine in FIG. 10 (return).

According to the first embodiment described above, the focus detecting operation is carried out by providing the half-mirror section at the part of the main mirror 14, by guiding the subject beams which have been transmitted through the half-mirror section to the focus detecting optical system 30 by the sub-mirror 19 and by irradiating the subject beam to the predetermined light receiving areas 152*a* and 152*b* in the image pickup area 100 of the CCD 21 via the focus detecting optical system 30.

That is, the focusing detecting operation is carried out by utilizing the image pickup means by guiding the part of the subject beam to the predetermined position of the image pickup means without specifically providing image pickup means dedicated for the focus detecting operation. Accordingly, it allows the number of components of the electronic image pickup apparatus to be reduced. Thus, it contributes to the down-sizing of the apparatus and to the reduction of the production cost of the whole apparatus.

The following means may be adopted for the focus detecting computing process carried out in the electronic image pickup apparatus of the first embodiment described above.

Figure 15:
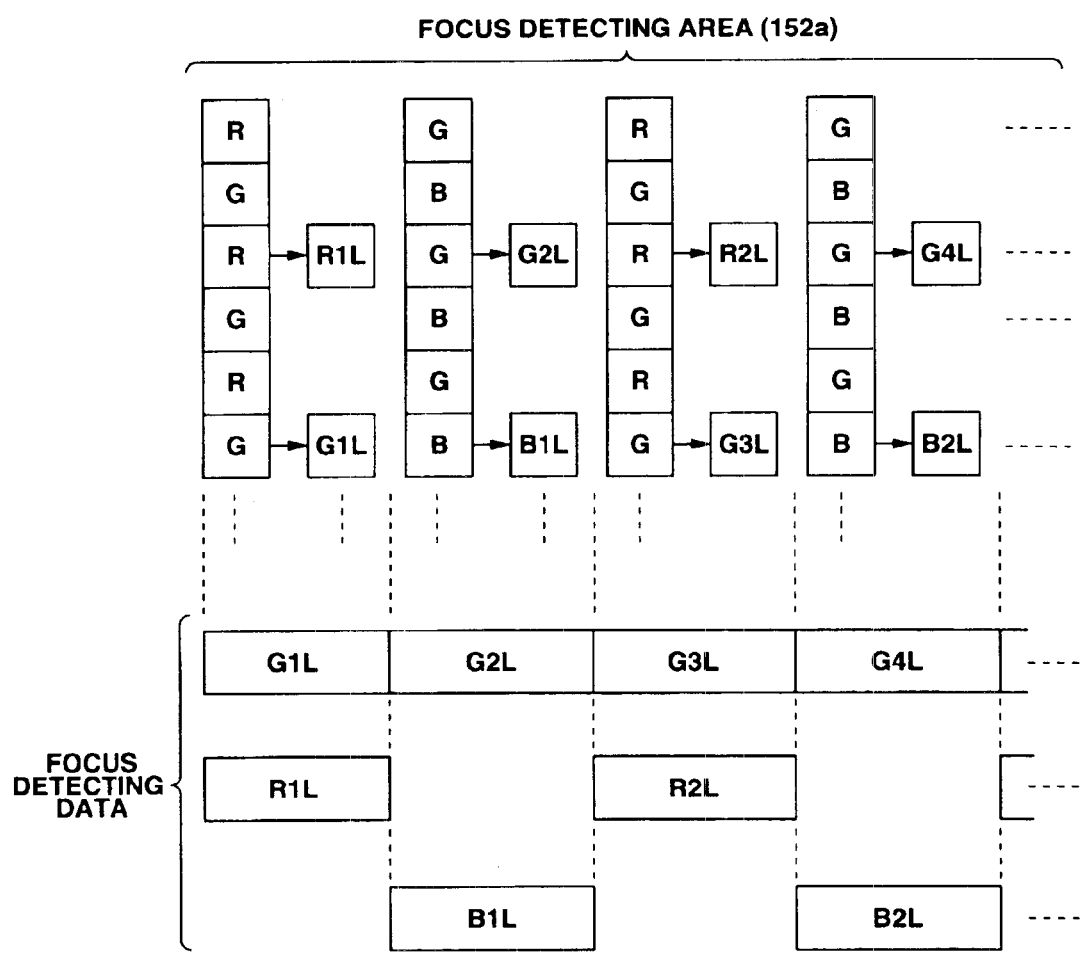
FIG. 15 is a conceptual diagram showing a modified example of the adding process of the focus detecting arithmetic operation carried out in the electronic image pickup apparatus of the first embodiment of the invention.

FIG. 15 is a conceptual diagram showing a modified example of the adding process of the focus detecting arithmetic operation carried out in the electronic image pickup apparatus of the first embodiment of the invention.

This modified example shows a case of carrying out a so-called culling reading of taking out only predetermined signals among image signals which may be obtained by the focus detecting light receiving areas 152a and 152b.

That is, the micro-computer 61 adds the same color signals in the focus detecting area, i.e., in the light receiving areas 152a and 152b, for example as shown in FIG. 15. In this case, the culling reading of obtaining one image signal out of three same color signals in the column direction is carried out and the read image signals are added within the vertical shift register 103.

This culling reading may be readily realized by controlling the operation of the vertical shift register 103 by controlling the reading clock when the CCD is applied as the image pickup device as the present applicant has disclosed in Japanese Patent Laid-Open No. Hei. 10-136244 for example.

It is noted that although FIG. 15 only shows one light receiving area 152a, the totally same process is carried out also in the other light receiving area 152b.

The time for reading the whole pixel signals may be shortened by reading the pixel signals per predetermined intervals in the column direction and the computing speed may be readily quickened because the number of pixel signals handled of the operating process is reduced. Therefore, the focus detecting operation can be further quickened.

Figure 16:
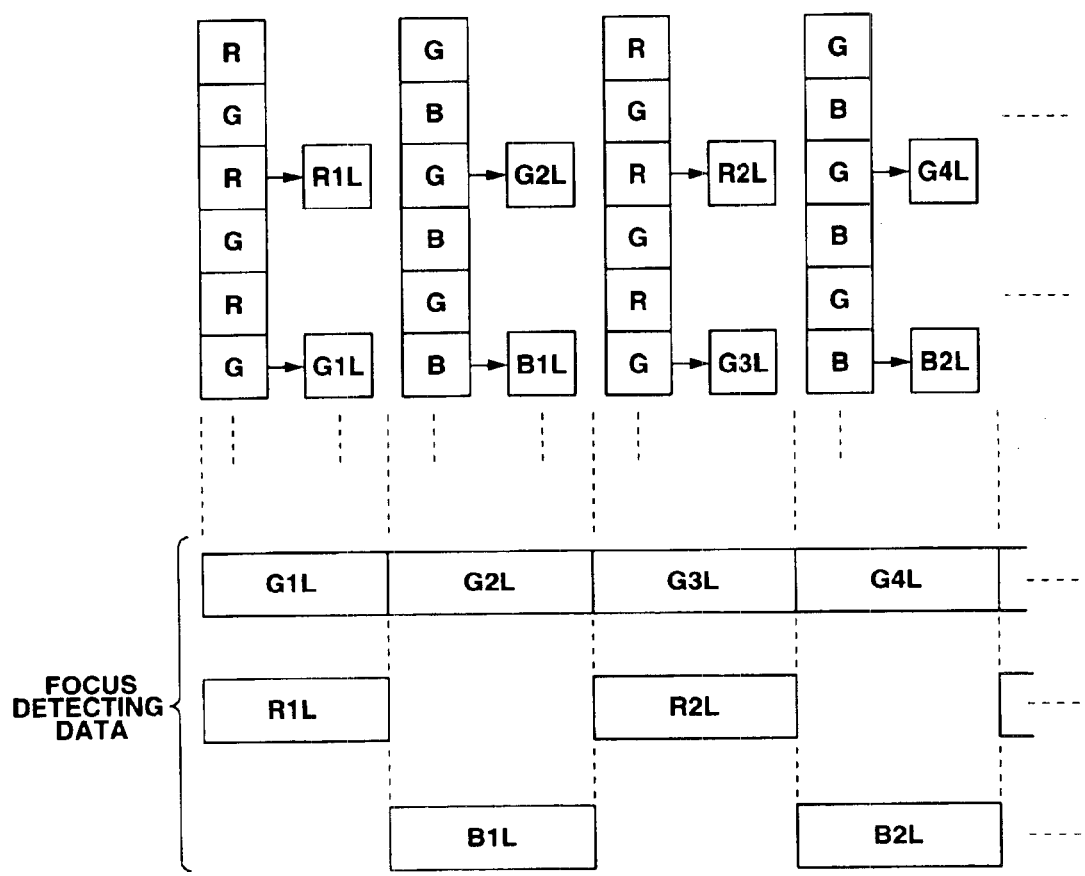
FIG. 16 is a conceptual diagram showing another modified example of the adding process of the focus detecting arithmetic operation carried out in the electronic image pickup apparatus of the first embodiment of the invention.

FIG. 16 is a conceptual diagram showing another modified example of the adding process of the focus detecting arithmetic operation carried out in the electronic image pickup apparatus of the first embodiment of the invention.

The modified example shown in FIG. 16 shows a different case of carrying out the culling reading of taking out only predetermined signals among the pixel signals which can be obtained by the focus detecting light receiving areas 152a and 152b in the same manner as with the case of FIG. 15.

In this case, the culling reading of obtaining two pixel signals out of three predetermined pixel signals among the same color signals in the column direction is accomplished in the same manner as with the modified example described above. The pixel signals thus read are added within the vertical shift register 103 in the same manner as with the first embodiment and its modified example.

Such a process allows the reading time to be shortened and the computing speed to be quickened due to the reduction of the number of pixel signals to be read in the same manner as with the modified example described above.

Next, a second embodiment of the invention will be explained below.

Figure 17:
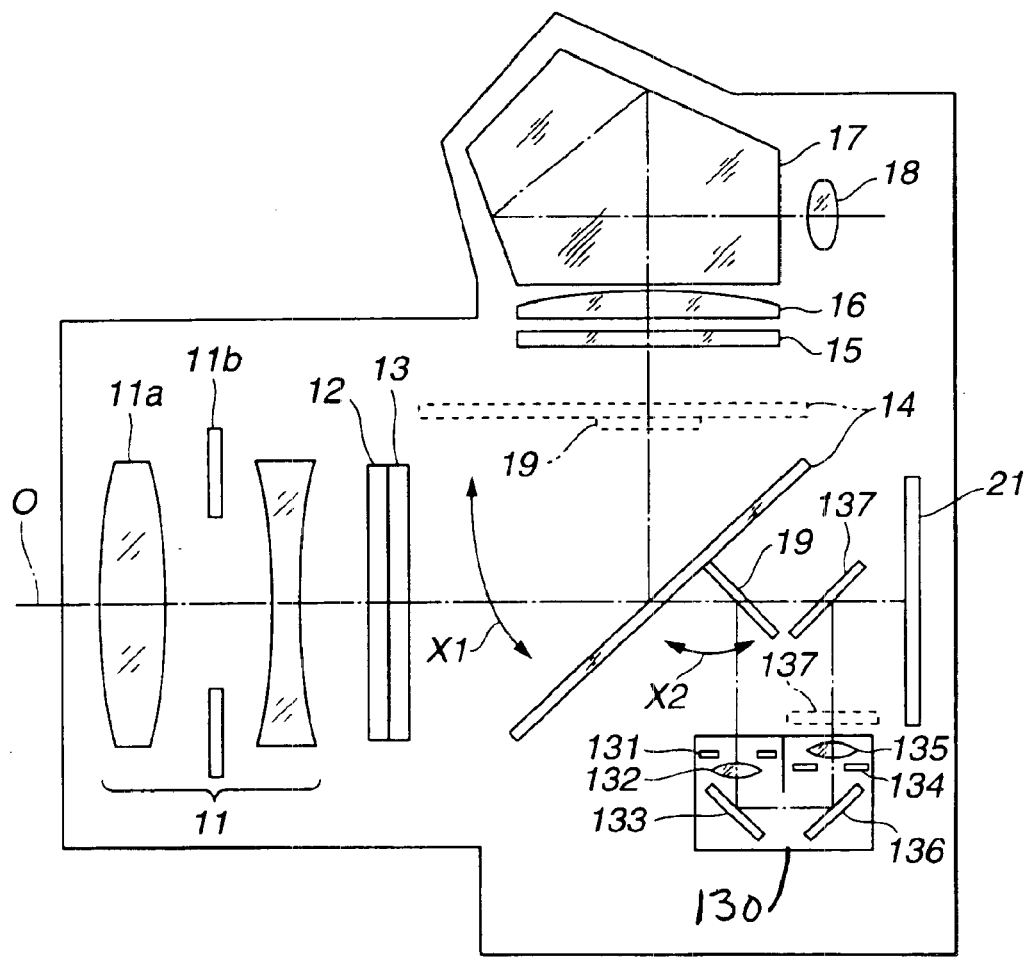
FIG. 17 is a diagram showing the disposition of the main components of an electronic image pickup apparatus of a second embodiment of the invention together with optical paths within the electronic image pickup apparatus of beams which have transmitted through a photographic optical system.

FIG. 17 is a diagram schematically showing the disposition of the main components of an electronic image pickup apparatus of a second embodiment of the invention together with optical paths within the electronic image pickup apparatus of beams which have been transmitted through a photographic optical system. FIG. 17 corresponds to FIG. 1 in the first embodiment and the components not related to the invention are omitted from the figure to simplify the figure.

The structure of the electronic image pickup apparatus of the present embodiment is basically the same as that of the first embodiment except for the structure of the focus detecting optical system.

A focus detecting optical system 130 of the present embodiment comprises a view field mask 131, a field lens 132, a first total reflection mirror 133, a second total reflection mirror 136, a pupil mask 134, and an image reforming lens 135 as shown in FIG. 17. The concept of the basic structure of the focus detecting optical system 130 is totally the same as that of the first embodiment (see FIGS. 2 and 3).

It is noted that a total reflection mirror 137 is disposed behind the sub-mirror 19 in the present embodiment in order to guide the focus detecting beam outputted from the focus detecting optical system 130 to a predetermined position of the image pickup area of the CCD 21. The total reflection mirror 137 is provided to guide the beam from the focus detecting optical system 130 located below to the CCD 21 disposed behind the electronic image pickup apparatus to form the image again on its light receiving plane by bending the optical path of the focus detecting beam from the focus detecting optical system 130 by reflecting it.

While the main mirror 14 and the sub-mirror 19 recede to the photographing position (the position of dashed line in FIG. 17) during the photographing operation also in the electronic image pickup apparatus, the total reflection mirror 137 also moves to the position where it will not block the subject beam, i.e., to the position indicated by a dashed line at FIG. 17, in the same time by a predetermined moving mechanism (not shown) to recede from the optical path of the subject beam.

Figure 18:
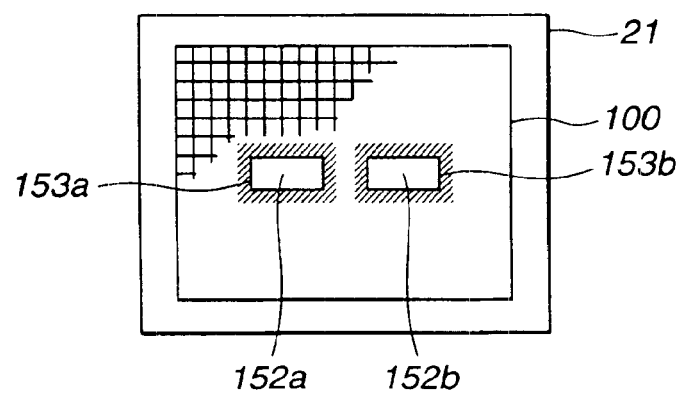
FIG. 18 is a conceptual diagram showing light receiving areas of light receiving section (image pickup area) of an image pickup device (CCD) corresponding to a focus detecting area of the photographing screen in the electronic image pickup apparatus of FIG. 17.

In the focus detecting optical system 130 constructed as described above, the focus detecting beam is inputted to the CCD 21 almost vertically to form the focus detecting image again at the predetermined position of the image pickup area 100. The view field mask images 153a and 153b and the focus detecting light receiving areas 152a and 152b formed on the image pickup area 100 of the CCD 21 will not deform like those in the first embodiment as shown in FIG. 18.

The other structure and operation of the electronic image pickup apparatus are almost the same as the electronic image pickup apparatus of the first embodiment.

It is noted that the total reflection mirror 137 also recedes to the outside of the optical path of the subject beam by the moving mechanism not shown at the same time when the main mirror 14 and the sub-mirror 19 recede to the outside of the optical path of the subject beam at the time of a photographing operation as described above in the present embodiment. It allows the whole subject beams which have been transmitted through the photographic optical system 11 to be irradiated to the image pickup area 100 of the CCD 21.

As described above, the second embodiment allows the same effects as the first embodiment to be obtained, the problem of deformation of the image (see FIG. 5) generated by the focus detecting optical system 30 in the electronic image pickup apparatus of the first embodiment to be eliminated and thus the focus detecting accuracy to be improved.

Next, a third embodiment of the invention will be explained below.

Figure 19:
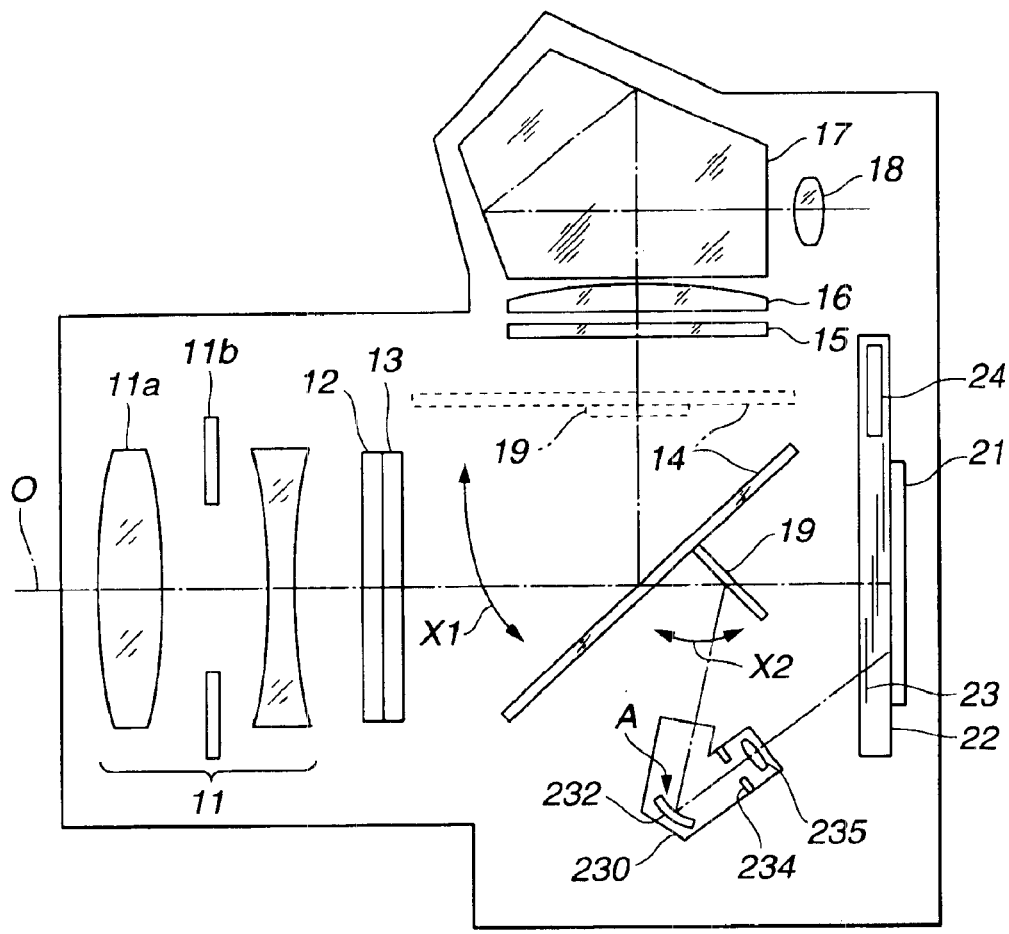
FIG. 19 is a diagram showing the disposition of the main components of an electronic image pickup apparatus of a third embodiment of the invention together with optical paths within the electronic image pickup apparatus of beams which have been transmitted through a photographic optical system.
Figure 20:
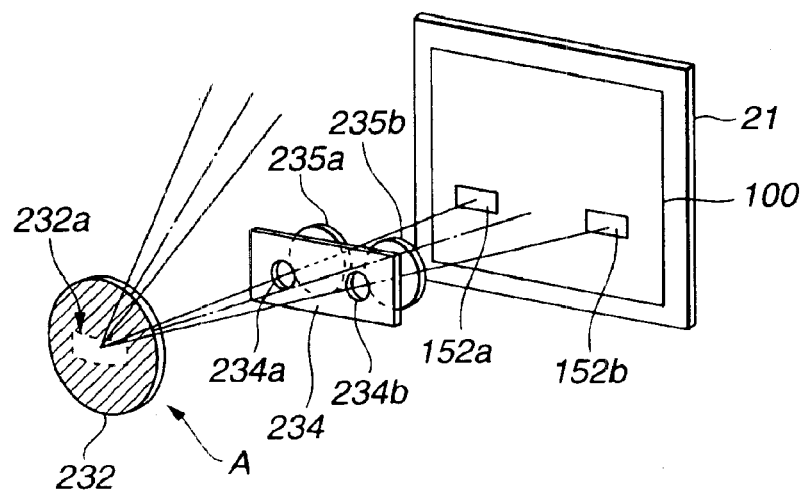
FIG. 20 is a perspective view showing the structure of the focus detecting optical system of the electronic image pickup apparatus in FIG. 19 and conceptually showing the state how the beams of the subject which have been transmitted through the photographic optical system arrive at the image pickup device via the focus detecting optical system.

FIG. 19 is a diagram showing the disposition of the main components of an electronic image pickup apparatus of a third embodiment of the invention together with optical paths within the electronic image pickup apparatus of beams which have been transmitted through the photographic optical system. FIG. 20 is a perspective view showing the concept of the structure of the focus detecting optical system of the electronic image pickup apparatus and conceptually showing the state how the beams of the subject which have been transmitted through the photographic optical system arrive at the image pickup device via a focus detecting optical system 230.

It is noted that FIG. 19 corresponds to FIG. 1 in the first embodiment and FIG. 20 corresponds to FIG. 3 in the first embodiment. The components not related to the invention are omitted from FIGS. 19 and 20 to simplify the figure.

The structure of the electronic image pickup apparatus of the present embodiment is basically the same as that of the first embodiment except for the structure of the focus detecting optical system and except that a focal plane shutter is disposed on the whole plane of the CCD 21.

The focus detecting optical system 230 of the present embodiment comprises a field mirror 233, a pupil mask 234, and an image reforming lens 235 as shown in FIG. 19. The field mirror 232 is formed of a reflecting mirror having a reflecting plane at the inside of a concave plane. The field mirror 232 is what realizes the functions of the view field mask 31, the field lens 32 and the total reflection mirror 33 comprising the focus detecting optical system 30 of the electronic image pickup apparatus of the first embodiment by one member.

The field mirror 232 is provided with a reflecting section 232a of a predetermined range near the center of the reflecting plane A so as to be able to reflect only a partial beam among the beam from the sub-mirror 19 (not shown in FIG. 20) which has been transmitted through the photographic optical system 11 (not shown in FIG. 20).

Because the field mirror 232 is formed of the reflecting mirror having the reflecting plane A at the inside of the concave plane as described above, only the predetermined beam condensed by the reflecting section 232a is reflected. Accordingly, the optical path of the beam is changed by that and is guided to the CCD 21 side. Thus, the field mirror 232 realizes the functions of the view field mask 31, the field lens 32 and the total reflection mirror 33 of the focus detecting optical system 30 in the first embodiment by one member.

Then, the beam reflected by the field mirror 232 is outputted from the focus detecting optical system 230 via the pupil mask 234 having two openings 234a and 234b and the image reforming lens 235 comprised of two lenses 235a and 235b.

The focus detecting beam outputted from the focus detecting optical system 230 as described above is inputted to the predetermined light receiving areas 152a and 152b of the image pickup area 100 of the CCD 21 as shown in FIG. 20.

Meanwhile, the focal plane shutter 22 which is a mechanical shutter mechanism is disposed in front of the CCD 21. The focal plane shutter 22 comprises a front sheet 23, a rear sheet 24 and other elements (not shown) similarly to what is applied to a single-lens reflex camera in general and carries out an exposing operation by a slit formed between the front sheet 23 and the rear sheet 24.

When the focusing detecting operation is carried out, i.e., when the electronic image pickup apparatus is in the photographing preparing state, the main mirror 14 is positioned as indicated by a solid line in FIG. 19 and the front sheet 23 is disposed at the position where it is released. Thereby, only the focus detecting beam is inputted to the predetermined light receiving areas 152a and 152b of the image pickup area 100 (see FIG. 20) of the CCD 21.

The light inputted to the part other than the predetermined light receiving areas 152a and 152b of the image pickup area 100 of the CCD 21 is blocked by the total reflection mirror section of the main mirror 14, i.e., by the area other than the half-mirror section corresponding to the sub-mirror 19, as in the first embodiment. Accordingly, only the focus detecting beam is inputted to the predetermined light receiving areas 152a and 152b of the image pickup area 100 (see FIG. 20) of the CCD 21 when the focus detecting operation is carried out.

When the photographing operation is carried out, the main mirror 14 and the sub-mirror 19 recede to the position (the photographing position) indicated by the dashed line in FIG. 19 and the focal plane shutter 22 is charged by the action of a mechanical charging mechanism (not shown) so as to set the front sheet 23.

Then, as a result of computing processes by the photometry and exposure computing section 45, the front sheet 23 and the rear sheet 24 are driven based on information of calculated shutter seconds to thus execute the main exposing operation.

Further, although the stopping member 11b has been completely closed to block the beam to the CCD 21 in reading the pixel data of the CCD 21 carried out after the main exposing operation in the electronic image pickup apparatus of the first embodiment described above, the stopping member 11b plays a role of only stopping function of restricting the input beam to the photographic optical system 11 by keeping the diaphragm opening because the light blocking state of the CCD 21 may be maintained by the focal plane shutter 22 disposed on the whole plane of the CCD 21.

The other structure is almost the same as that of the electronic image pickup apparatus of the first embodiment. The action thereof is also the same as that of the first embodiment except that the action of the focal plane shutter 22 described above is added and the light blocking operation of the stopping member 11b becomes unnecessary.

As described above, the third embodiment allows the same effects as the first embodiment to be obtained. In addition to that, the functions realized by the view field mask 31, the field lens 32 and the total reflection mirror 33 of the focus detecting optical system 30 in the electronic image pickup apparatus of the first embodiment are achieved by one member of the field mirror 232 in the focus detecting optical system 230 of the electronic image pickup apparatus of the third embodiment, so that the third embodiment allows a number of members comprising the focus detecting optical system 230 to be reduced and the structure thereof to be simplified. Accordingly, it contributes to the reduction of the production cost of the whole electronic image pickup apparatus.

Further, because the light blocking state of the CCD 21 is maintained by the focal plane shutter 22 disposed on the whole plane of the CCD 21 in reading pixel data of the CCD 21 carried out after the main exposing operation, the stopping member 11b carries out only the operation of restricting the beam from entering the photographic optical system 11 by keeping the diaphragm opening. Accordingly, the third embodiment allows the control sequence of the diaphragm driving section 63 for driving the stopping member 11b to be simplified further.

Next, a fourth embodiment of the invention will be explained.

Figure 21:
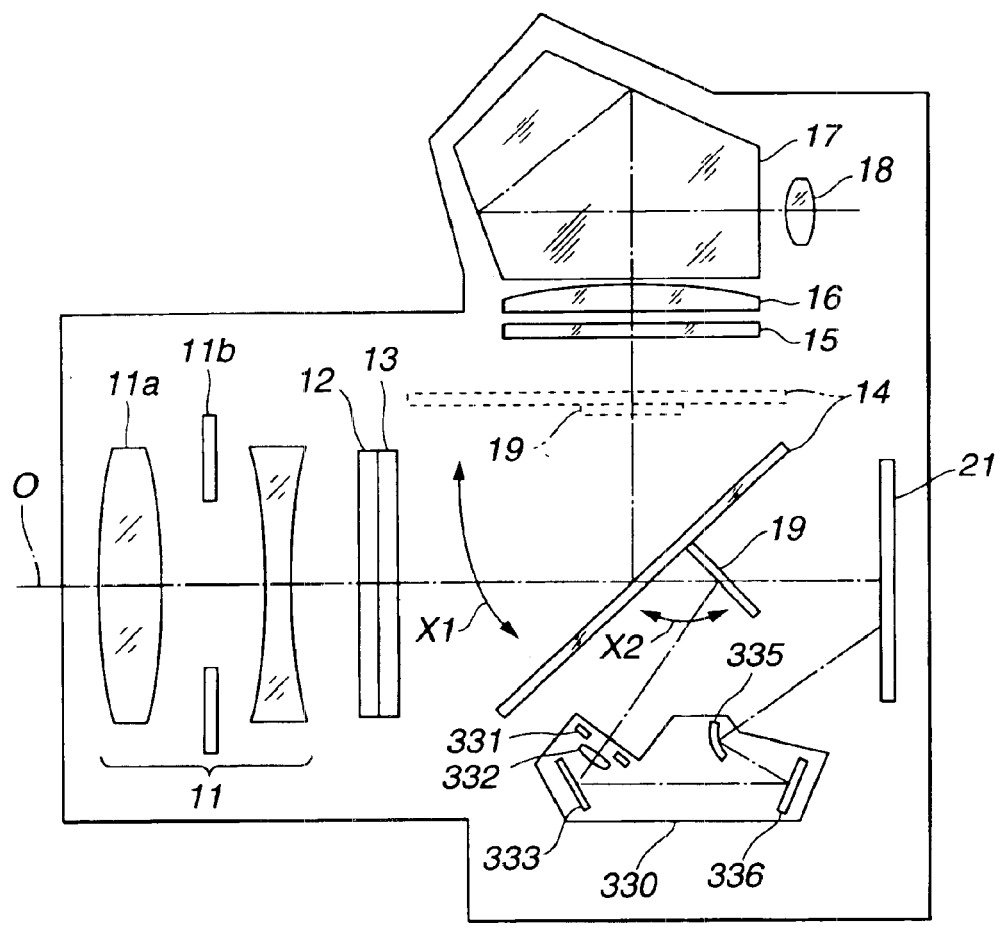
FIG. 21 is a diagram showing the disposition of the main components of an electronic image pickup apparatus of a fourth embodiment of the invention together with optical paths within the electronic image pickup apparatus of beams which have been transmitted through a photographic optical system.
Figure 22:
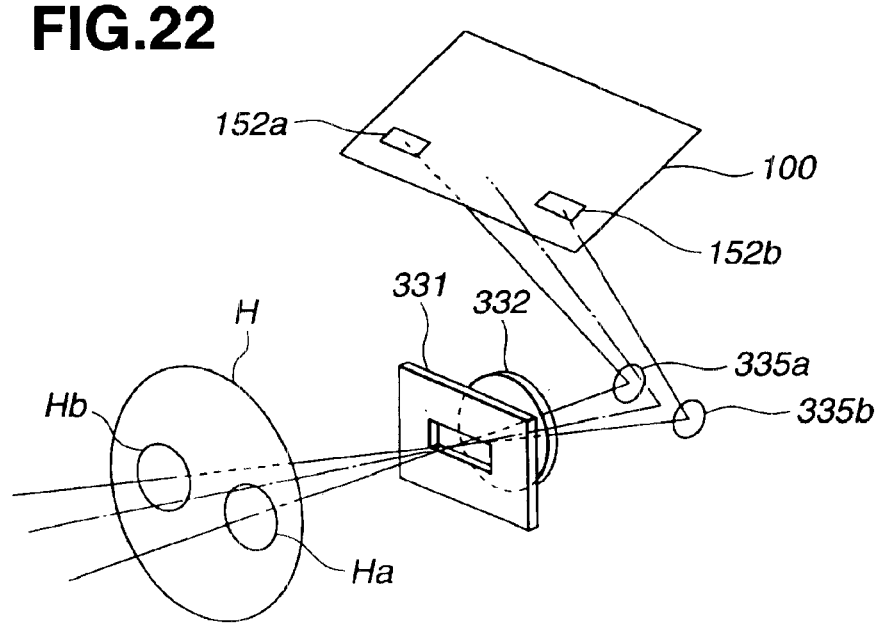
FIG. 22 is a perspective view showing the structure of the focus detecting optical system of the electronic image pickup apparatus of FIG. 21 and conceptually showing the state how the beams of the subject which have been transmitted through the photographic optical system arrive at the image pickup device via the focus detecting optical system.

FIG. 21 is a diagram showing the disposition of the main components of an electronic image pickup apparatus of the fourth embodiment of the invention together with optical paths within the electronic image pickup apparatus of beams which have been transmitted through the photographic optical system and FIG. 22 is a perspective view showing the structural concept of the focus detecting optical system of the electronic image pickup apparatus and conceptually showing the state how the beams of the subject which have been transmitted through the photographic optical system arrive at the CCD 21 via the focus detecting optical system 330.

It is noted that FIG. 21 corresponds to FIG. 1 in the first embodiment and FIG. 22 corresponds to FIG. 3 in the first embodiment. The components not related to the invention are omitted from FIGS. 21 and 22 to simplify the figures.

The structure of the electronic image pickup apparatus of the present embodiment is basically the same as that of the first embodiment except for the structure of the focus detecting optical system.

The focus detecting optical system 330 of the present embodiment comprises a view field mask 331, a field lens 332, a first total reflection mirror 333, a second total refection mirror 336, and an image reforming lens 235 as shown in FIG. 21. The image reforming mirror 335 comprises mirrors 335a and 335b which are two concave reflecting mirrors having the total reflection plane at the inside. The image reforming mirror 335 has the functions of the pupil mask 34 and the image reforming lens 35 comprising a part of the focus detecting optical system 30 in the electronic image pickup apparatus of the first embodiment.

A reflecting section of a predetermined range is provided in the vicinity of the center of each reflecting plane of the two mirrors 335a and 335b of the image reforming mirror 335 similarly to the field mirror 232 of the focus detecting optical system 230 in the electronic image pickup apparatus of the third embodiment described above. Accordingly, it has the function of the pupil mask 34 of the focus detecting optical system 30 in the first embodiment. At the same time, the image reforming mirror 335 has the function of the image reforming lens 35 for forming a predetermined image again by condensing the beam by the condensing and reflecting actions of the concave reflecting mirror.

The other structure and operation are almost the same as those of the electronic image pickup apparatus of the first embodiment.

It is noted that the optical path of the focus detecting beam which has been guided from the sub-mirror 19 to the focus detecting optical system 330 follows the following path when the focus detecting operation is carried out in the present embodiment.

That is, the focus detecting subject beams which have been transmitted through the photographic optical system 11 and which have been guided from the sub-mirror 19 to the focus detecting optical system 330 is restricted by the view field mask 331 as a beam of predetermined quantity. After passing it, the beam is condensed by the field lens 332 and is reflected by the reflecting plane of the first total reflection mirror 333. Thereby, the optical path is changed and the beam is guided to the second total reflection mirror 336. Then the beam is reflected again by the second total reflection mirror 336 and changes the optical path, and is guided to the image reforming mirror 335.

Each beam inputted to the two mirrors 335a and 335b of the image reforming mirror 335 are reflected by the respective reflecting planes and two images are irradiated to the two predetermined light receiving areas 152a and 152b to form a predetermined image. Then, the focus detecting operation is executed based on the two images.

The other structure and operation are almost the same as that of the electronic image pickup apparatus of the first embodiment.

The fourth embodiment allows the same effects as the first embodiment to be obtained as described above.

Further, although there has been a problem such as a dislocation of the images by being influenced by aberration caused due to the lenses 35a and 35b in the focus detecting optical system 30 of the electronic image pickup apparatus of the first embodiment because the beams which have passed through the two openings 34a and 34b of the pupil mask 34 are formed again by the two lenses 35a and 35b of the image reforming lens 35, such problem may be solved by realizing the functions of the pupil mask 34 and the image reforming lens 35 of the focus detecting optical system 30 of the electronic image pickup apparatus of the first embodiment by the image reforming mirror 335. Accordingly, a highly accurate focus detecting operation may be readily realized.

While the preferred embodiments have been described, it is apparent that the invention is not limited thereto but may be otherwise variously embodied within the spirit and scope of the invention. The scope of the invention is therefore to be determined solely by the appended claims.

What is claimed is:

1. An electronic image pickup apparatus, comprising:
   a photographic optical system;
   solid state image pickup devices disposed on a plane where a subject image formed by subject beams which have passed through said photographic optical system is formed;
   a main mirror disposed between said photographic optical system and said solid state image pickup devices, wherein a part of said main mirror comprises a half mirror to divide the subject beams which have passed through said photographic optical system into an observing beam and a focus detecting beam;
   a sub-mirror for reflecting the subject beam which has passed through the part of said main mirror;
   a focus detecting optical system for forming an image of the subject beam reflected by said sub-mirror on partial areas of said solid state image pickup devices; and
   an electrical circuit for outputting focus detecting information based on image signals of the partial areas of said solid image pickup devices;
   wherein a first end of said main mirror is adapted to be turned to insert said main mirror and said sub-mirror into an optical path of said subject beams; and
   wherein the focus detecting optical system comprises:
      a view field mask for restricting an irradiation range of said subject beam which has passed through the part of said main mirror;
      a field lens for condensing a subject beam which has passed through said view field mask;
      a reflecting mirror for bending the optical path of a subject beam which has passed through said field lens to guide said subject beam to said solid state image pickup devices;
      a pupil mask having openings for splitting a subject beam which has been reflected by said reflecting mirror into two beams; and
      two image reforming lenses disposed behind said openings.

2. The electronic image pickup apparatus according to claim 1, wherein said focus detecting optical system forms images in two areas on said solid state image pickup devices; and
   wherein said electrical circuit detects a focus state from the two image signals formed in the two areas of said solid state image pickup devices to output focus detecting information.

3. The electronic image pickup apparatus according to claim 1, wherein said main mirror and said sub-mirror recede to outside of the optical path of the subject beams when a photographing operation using the solid state image pickup devices is executed.

4. The electronic image pickup apparatus according to claim 1, wherein the view field mask guides only a beam contributing to the detection of a focal point to said solid state image pickup devices.

5. An electronic image pickup apparatus, comprising:
a photographic optical system;
a finder optical system for allowing a subject image formed of subject beams which have passed through said photographic optical system to be observed;
solid state image pickup devices disposed on a plane where the subject image formed by the subject beams which have passed through said photographic optical system is formed;
a reflecting mirror for reflecting at least a part of said subject beams in a direction different from said finder optical system;
a focus detecting optical system for forming an image of a subject beam reflected by said reflecting mirror on a predetermined area of said solid state image pickup devices; and
an electrical circuit for outputting focus detecting information based on image signals of the predetermined areas of said solid state image pickup devices;
wherein a first end of said reflecting mirror is adapted to be turned to insert said reflecting mirror into an optical path of said subject beams; and
wherein the focus detecting optical system comprises:
a view field mask for restricting an irradiation range of said subject beam reflected by said reflecting mirror;
a field lens for condensing a subject beam which has passed through said view field mask;
another reflecting mirror for bending the optical path of a subject beam which has passed through said field lens to guide said subject beam to said solid state image pickup devices;
a pupil mask having openings for splitting a subject beam which has been reflected by said another reflecting mirror into two beams; and
two image reforming lenses disposed behind said openings.

6. The electronic image pickup apparatus according to claim 5, wherein said reflecting mirror recedes to outside of the optical path of the subject beams when a photographing operation using the solid state image pickup devices is executed.

7. An electronic image pickup apparatus, comprising:
a photographic optical system;
image pickup means for executing an image pickup operation for picking up a subject image via said photographic optical system;
a reflecting unit which is turnable about a first end thereof to insert said reflecting unit between said photographic optical system and said image pickup means during a photographing preparing state to reflect at least a part of the subject beams to outside of a photographing optical path;
a focus detecting optical system for forming an image of subject beams reflected by said reflecting unit in a predetermined area in an image pickup area of said image pickup means; and
focus detecting means for carrying out a focus detecting operation based on signals from said image pickup means;
wherein the focus detecting optical system comprises:
a view field mask for restricting an irradiation range of said subject beam reflected by said reflecting unit;
a field lens for condensing a subject beam which has passed through said view field mask;
a reflecting mirror for bending the optical path of a subject beam which has passed through said field lens to guide said subject beam to said solid state image pickup devices;
a pupil mask having openings for splitting a subject beam which has been reflected by said reflecting mirror into two beams; and
two image reforming lenses disposed behind said openings.

8. The electronic image pickup apparatus according to claim 7, wherein the focus detecting operation carried out by said focus detecting means is a phase difference detecting method.

9. The electronic image pickup apparatus according to claim 7, wherein a focus detecting beam to said focus detecting optical system is blocked when said photographing operation is executed.

10. The electronic image pickup apparatus according to claim 7, wherein beams other than a focus detecting beam to said image pickup means are blocked when said focus detecting operation is executed.

11. The electronic image pickup apparatus according to claim 7, wherein said image pickup means comprises a solid state image pickup device.

* * * * *